(12) United States Patent
Isei et al.

(10) Patent No.: US 9,003,846 B2
(45) Date of Patent: Apr. 14, 2015

(54) METHOD FOR MEASURING FLATNESS OF SHEET MATERIAL AND METHOD FOR MANUFACTURING STEEL SHEET USING THE SAME

(71) Applicants: Yoshito Isei, Osaka (JP); Tomoya Kato, Osaka (JP); Masahiro Osugi, Osaka (JP); Hideyuki Takahashi, Osaka (JP)

(72) Inventors: Yoshito Isei, Osaka (JP); Tomoya Kato, Osaka (JP); Masahiro Osugi, Osaka (JP); Hideyuki Takahashi, Osaka (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 0 days.

(21) Appl. No.: 13/654,907

(22) Filed: Oct. 18, 2012

(65) Prior Publication Data
US 2013/0098127 A1    Apr. 25, 2013

Related U.S. Application Data

(63) Continuation of application No. PCT/JP2010/058329, filed on May 18, 2010.

(51) Int. Cl.
| | |
|---|---|
| *B21B 37/00* | (2006.01) |
| *B21C 51/00* | (2006.01) |
| *G01B 11/30* | (2006.01) |
| *G01B 11/25* | (2006.01) |
| *B21B 1/22* | (2006.01) |
| *B21B 38/02* | (2006.01) |

(52) U.S. Cl.
CPC .............. *G01B 11/303* (2013.01); *B21B 38/02* (2013.01); *B21C 51/00* (2013.01); *G01B 11/2513* (2013.01); *G01B 11/306* (2013.01); *B21B 1/22* (2013.01)

(58) Field of Classification Search
USPC ...................... 72/7.1–14.8, 201, 37; 700/154; 250/559.05, 559.07, 559.08; 348/135, 348/136, 143, 148, 149, 152
See application file for complete search history.

(56) References Cited

U.S. PATENT DOCUMENTS 5,065,237 A * 11/1991 Tsikos et al. .................... 348/91
6,286,349 B1 * 9/2001 Muller et al. .................. 72/11.7
(Continued)

FOREIGN PATENT DOCUMENTS

| | | |
|---|---|---|
| JP | 61-40503 | 5/1994 |
| JP | 2001-21332 | 1/2001 |
| JP | 2001-174415 | 6/2001 |
| JP | 2006-277023 | 10/2006 |
| JP | 2008-058036 | 3/2008 |

(Continued)

OTHER PUBLICATIONS

Machine Translation of JPO translation of JP 2008-058036A.*

*Primary Examiner* — Shelley Self
*Assistant Examiner* — Pradeep C Battula
(74) *Attorney, Agent, or Firm* — Clark & Brody

(57) ABSTRACT

Measuring sheet material flatness includes projecting a bright and dark pattern made up of bright parts and dark parts onto a sheet material surface travelling in a lengthwise direction, picking up an image of pattern with image pickup device to acquire a pattern image, with the pickup device having a field of view larger than a sheet material width. The acquired pattern image is analyzed, wherein a pattern in which a bright part is disposed at a predetermined set pitch respectively in longitudinal and lateral directions is formed by an LED light at a predetermined pitch respectively in the longitudinal and lateral directions. The pattern is projected onto the surface such that the longitudinal direction of the pattern lies along a lengthwise direction of the sheet material, and the lateral direction of the pattern lies along a width direction of the sheet material.

12 Claims, 22 Drawing Sheets

(56) References Cited

U.S. PATENT DOCUMENTS 6,509,967 B1 * 1/2003 Pingel et al. ............. 356/239.1
7,184,585 B2 * 2/2007 Hamza et al. ............. 348/135

FOREIGN PATENT DOCUMENTS

| WO | 95/22925 | 8/1995 |
| WO | 2005/038445 | 4/2005 |

* cited by examiner

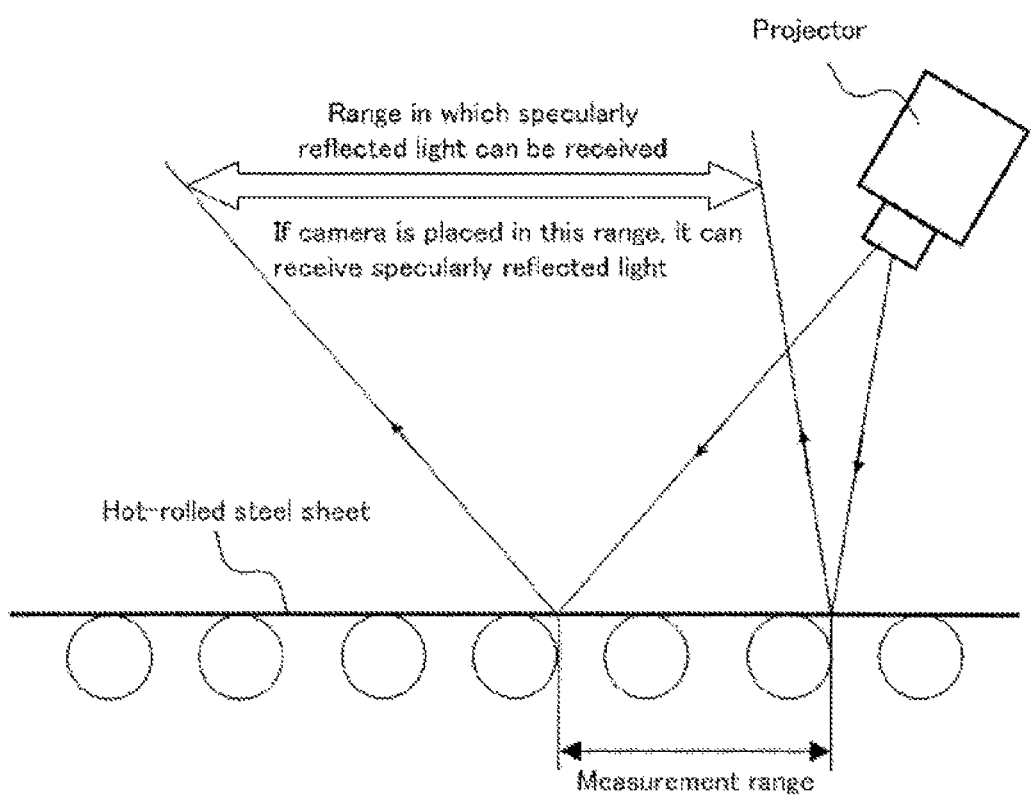

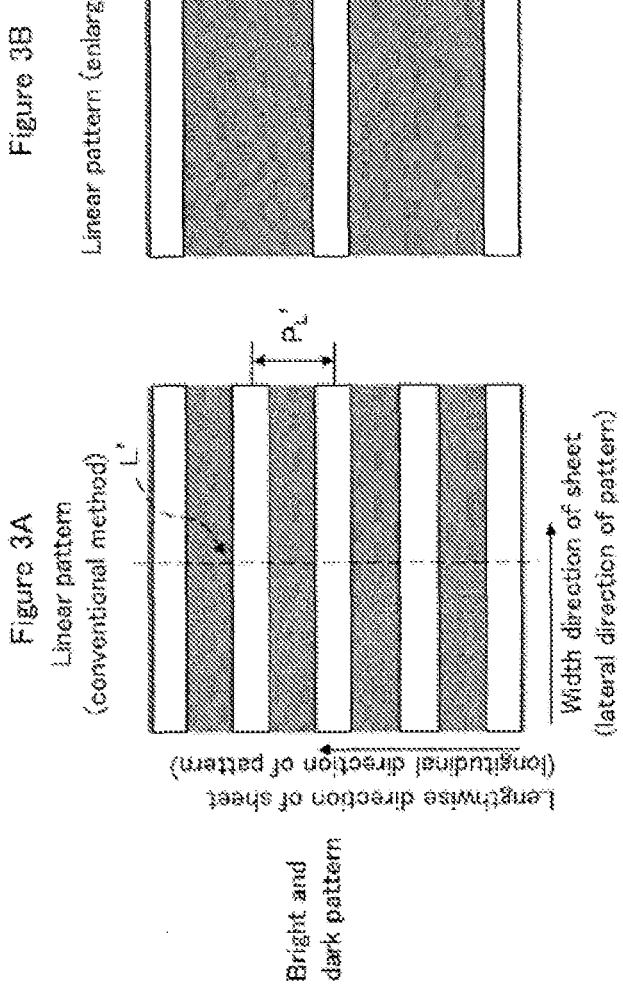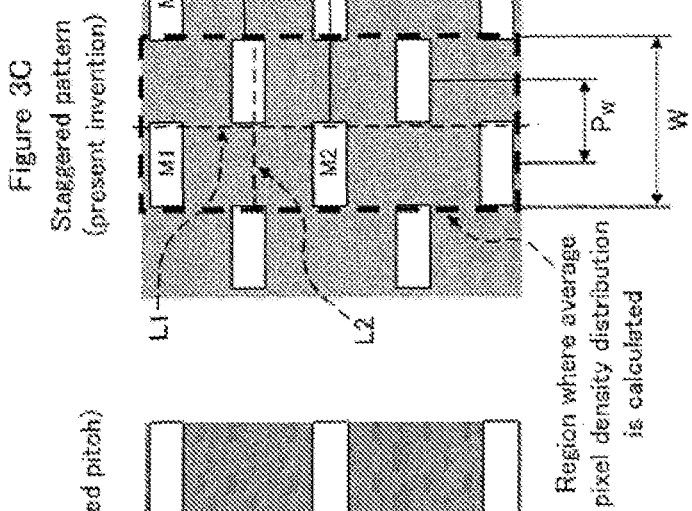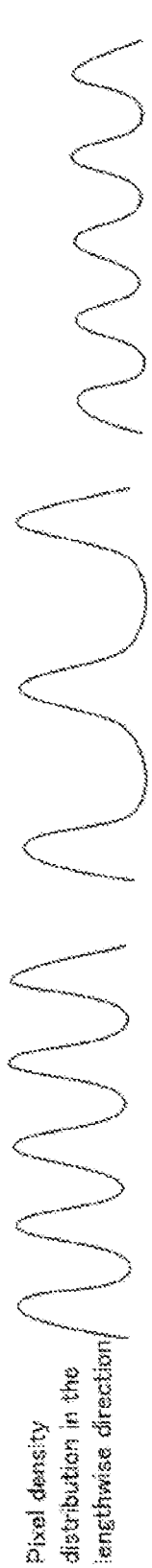

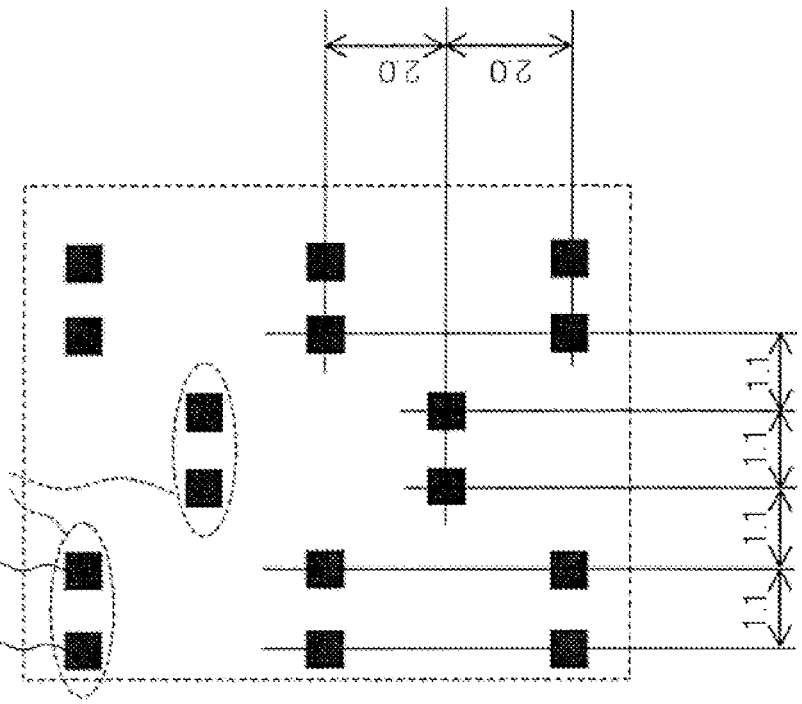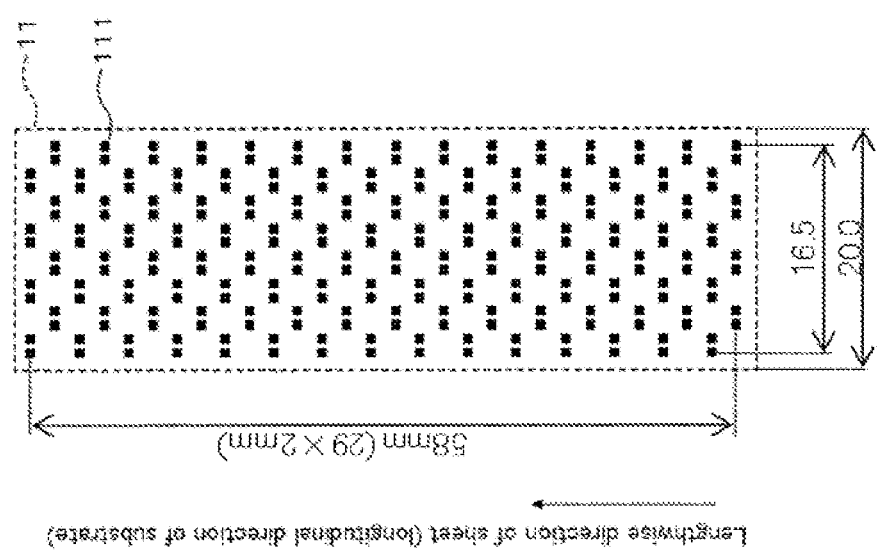

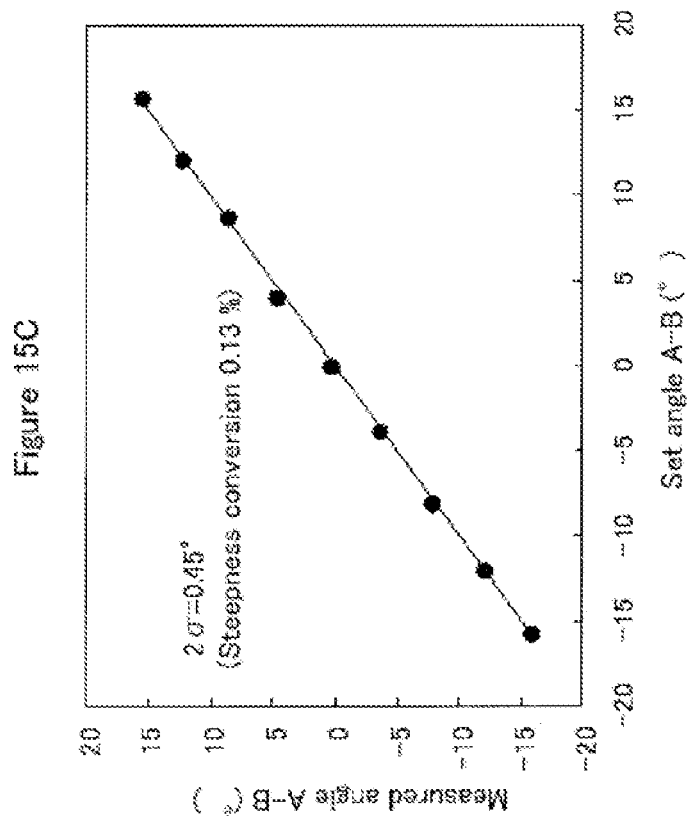
Figure 15C
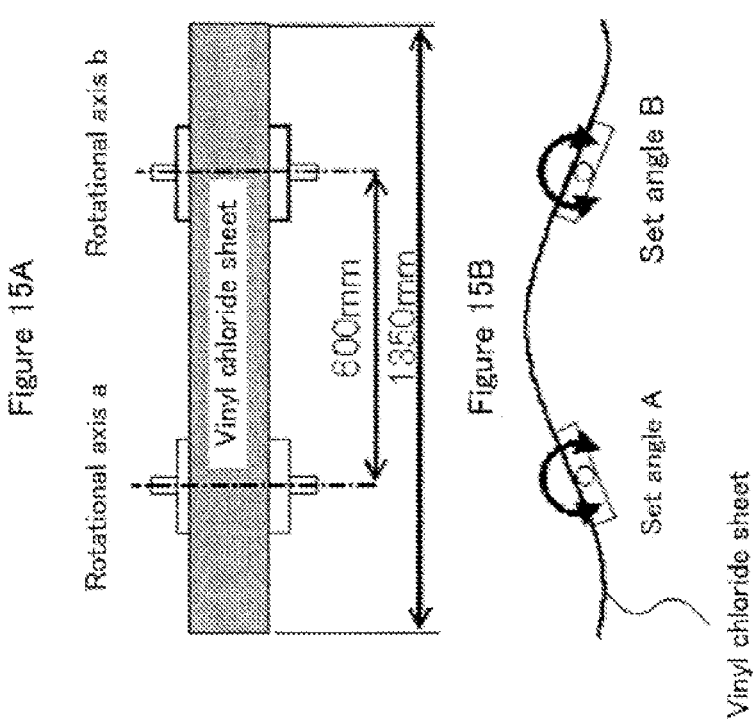
Figure 15A
Figure 15B

METHOD FOR MEASURING FLATNESS OF SHEET MATERIAL AND METHOD FOR MANUFACTURING STEEL SHEET USING THE SAME

This application is a continuation application based on PCT/P2010/058329, filed on May 18, 2010, which is herein incorporated in its entirety by reference.

TECHNICAL FIELD

The present invention relates to a method for measuring a flatness of a sheet material such as a steel sheet travelling in the lengthwise direction, and a method for manufacturing a steel sheet using the same.

BACKGROUND ART

A good flatness is required for sheet materials in order to both maintain quality and to achieve stable manufacturing. For this reason, an appropriate control of the flatness has been an issue in the manufacturing process of a sheet material.

Generally, as an index to represent the flatness, values such as a differential elongation rate and a steepness are used.

A differential elongation rate $\Delta\epsilon$ is the difference between an elongation rate $\epsilon_{CENT}$ of a widthwise central portion of a sheet material and an elongation rate $\epsilon_{EDGE}$ of a portion other than the widthwise central portion of the sheet material (typically a portion near an edge thereof) in a certain section in the lengthwise direction of a sheet material, and is represented by the following Formula (2).

$$\Delta\epsilon = \epsilon_{CENT} - \epsilon_{EDGE} \qquad (2)$$

Further, a steepness $\lambda$ is defined as $\lambda = \delta/P$ by using a height $\delta$ of a standing wave of sheet and a pitch P thereof. By approximating the shape of the standing wave of sheet with a sine wave, a well-known, relationship represented by the following Formula (3) exists between the differential elongation rate $\Delta\epsilon$ and the steepness $\lambda$ (%).

$$\lambda = \begin{cases} +\dfrac{2}{\pi}|\Delta\varepsilon|^{1/2} \times 100 & \text{(in the case of } \Delta\varepsilon \geq 0\text{)} \\ -\dfrac{2}{\pi}|\Delta\varepsilon|^{1/2} \times 100 & \text{(in the case of } \Delta\varepsilon < 0\text{)} \end{cases} \qquad (3)$$

For example, the manufacturing line for a hot-rolled steel sheet, which is an example of the sheet material is generally made up of a heating furnace, a roughing-down mill, a finish-rolling mill train, a cooling zone, and a coil winding machine. A slab which has been heated by the heating furnace is rolled by the roughing-down mill to be formed into a billet (crude bar) having a thickness of 30 to 60 mm. Next, the billet is rolled by the finish-rolling mill train consisting of six to seven finish rolling mills to be formed into a hot-rolled steel sheet having a thickness required from a client. This hot-rolled steel, sheet is cooled in the cooling zone and is wound up by the coil winding machine.

Manufacturing a hot-rolled steel sheet having a good flatness is crucial for ensuring a product quality as well as for stably passing a sheet through the finish-rolling mill train and winding the sheet up with the coil winding machine, thereby maintaining high productivity. A flatness defect of hot-rolled steel sheet is caused by an unevenness of elongation rate in the width direction of pate generated in a finish-rolling mill train and a cooling zone. Accordingly, there are proposed as a method for manufacturing a hot-rolled steel sheet having a good flatness, a method in which a flatness meter or a sheet thickness profiler is installed either between finish-rolling mills or at an exit side of a finish-rolling mill train and a work roll bender of a finish rolling mill is feedback controlled based on measured values thereof, and a method in which setup conditions such as a shift position of work roll and a load distribution of a finish-rolling mill train are learning-controlled. The control method as described above is described in, for example, JP11-104723A. Moreover, there is also proposed a method in which a flatness meter is installed at an exit side of a cooling zone and the amount of cooling water in each cooling nozzle of the cooling zone is feedback controlled based on measured values thereof. In order to perform the control methods as described above, methods and apparatuses for measuring the flatness of a hot-rolled steel sheet travelling at a high speed, between finish rolling mills, at the exit side of a finish-rolling mill train, or at the exit side of a cooling zone are developed and applied to real machines.

As a conventional flatness measurement method for a hot-rolled steel sheet, there is known a method in which a linear pattern consisting of a plurality of bright lines extending in the width direction of sheet is projected onto the surface of a hot-roiled steel sheet which is hot-rolled and travels, and an image of the linear pattern is picked up from a direction different from the projection, direction of the linear pattern with a two-dimensional camera, and the surface shape, that is, the flatness of the hot-roiled steel sheet is measured based on the distortion of the linear pattern in the picked-up image. In this method, by projecting a liner pattern over a range of about 1 m in the lengthwise direction (rolling direction) of the hot-rolled steel sheet, deterioration of measurement accuracy in a state where a standing wave of sheet remains in a constant position is suppressed, the standing wave of sheet being often observed in an immediate vicinity of the exit side of the finish rolling mill (the standing wave of sheet is anchored by the finish rolling mill, thereby forming a stationary end). The flatness measurement method as described above is described in, for example, JP61-40503A and JP2008-58036A.

JP61-40503A describes a method in which a linear pattern consisting of three bright lines is projected onto the sheet surface by respectively scanning three laser beams, which are thrown while being spaced apart in the lengthwise direction of the sheet, at a high speed in the width direction of sheet, and the surface shape, that is, the flatness of the sheet is measured based on the distortion of the linear pattern in a picked-up image which is obtained by picking up an image of the linear pattern with a camera. However, a problem exists in that the liner pattern consisting of three bright lines does not allow the surface shape of the sheet to be measured at a high accuracy, and the measurement accuracy significantly deteriorates particularly when the period of the standing wave of sheet is small.

Further, JP2008-58036A describes a method in which a high-density linear pattern consisting of a plurality of bright lines extending in the width direction of sheet is projected onto a surface of sheet material by using a slide on which the high-density linear pattern is drawn, and the surface shape, that is, the flatness of the sheet material is measured based on the linear pattern in a picked-up image obtained by photographing the linear pattern with a camera. In this method, since differing from the method described in JP61-40503A, a high-density linear pattern is projected, the measurement resolution (spatial resolution) of surface shape increases and a highly accurate measurement of the surface shape of sheet material can be expected.

The shape measurement method as described in JP2008-58036A is generally referred to as a "grating pattern projection method," and is widely used for various applications without being limited to the case where the surface shape of steel sheet is measured.

FIG. 1 is a diagram to schematically show a configuration example of the apparatus for performing a grating pattern projection method. As shown in FIG. 1, in the grating pattern projection method, a grating pattern pattern is projected onto the surface of a sheet material from diagonally above with respect to the surface of sheet material by using a projector including a light source, a slide on which a grating pattern pattern (generally a linear pattern) is drawn, and an image-forming lens. Then, from, a direction different from the projection direction of the grating pattern pattern, an image of the grating pattern projected onto the surface of sheet material is picked up by using a two-dimensional camera. At this moment, when the surface shape of the sheet material changes, the inclination angle of the surface of sheet material changes so that the pitch (generally, the spacing between each, bright lines making up the linear pattern) of the grating pattern in a picked-up image taken by a camera also increases according to the aforementioned inclination angle of the surface of sheet material. The relationship between the inclination angle of the surface of sheet material and the pitch of the grating pattern in a picked-up image can be geometrically calculated. Therefore, measuring the pitch of the grating pattern, in a picked-up image will allow the calculation of the inclination angle of the surface of sheet material based on the measured, result and the aforementioned relationship. Then, integrating the calculated inclination angle allows the calculation of the surface shape of the sheet material.

SUMMARY OF INVENTION

When the surface shape, that is, the flatness of a hot-rolled steel sheet is measured by using the above described grating pattern projection method, a linear pattern consisting of a plurality of bright lines extending in the width direction of sheet is projected as a grating pattern to the surface of steel sheet as described above. Then, in the picked-up image of the linear pattern, a shape measurement line extending along the lengthwise direction of the hot-rolled steel sheet is set at a position where the surface shape needs to be measured for calculating the flatness, and the distribution of pitch of the linear pattern (spacing between each bright lines consisting of the linear pattern) which lies on the shape measurement line is calculated based on the density distribution of pixels on the shape measurement line. Next, the distribution of inclination angle of the surface of steel sheet on the above described shape measurement line is calculated based the distribution of the pitch of the linear pattern which lies on the shape measurement line, and this inclination angle is integrated along the shape measurement line, thereby calculating the surface shape of the steel sheet on the shape measurement line. Further, based on the calculated surface shape, the flatness is calculated.

When an apparatus for performing a grating pattern projection method as shown in FIG. 1 is installed in the manufacturing line of hot-rolled steel sheet to control the finish-rolling mill train through a feedback of a measured value of flatness in real time, the apparatus needs to be installed in the immediate vicinity of the exit side of the finish-rolling mill train. Since the immediate vicinity of the finish-rolling mill train, is provided with measurement instruments such as a sheet thickness meter, a sheet width meter, and a sheet temperature gauge and, in addition, a cooling zone based on water cooling is provided at a close position, it is very often the case that a sufficient installation space of the apparatus cannot be secured.

To make the installation space for the apparatus as small as possible, it is conceivable that the projector and the camera are placed closer to the hot-rolled steel sheet to reduce the installation space in the vertical direction, and the projector's angle of view and the camera's angle of view are set to be on the larger side so that the measurement range (about 1 m in the lengthwise direction) of the hot-rolled steel sheet is within the each angle of view. However, when the projector's angle of view is large as shown in FIG. 2, it will become necessary to dispose the camera at a location where it can receive the specularly reflected light of the projected light from the projector (the specularly reflected light of a linear pattern) to reduce the installation space in the horizontal direction. In view of improving the measurement resolution (spatial resolution) of surface shape, a linear pattern with a smaller pitch may be projected. However, since the surface of a hot-rolled steel sheet immediately after finish rolling has a high specular reflectivity (a large reflection intensity of specular reflection components), if the camera is disposed at a location where it can receive the specularly reflected light of the projected light from the projector, the output signal from a light receiving element that receives specularly reflected light, among the light receiving elements of the camera, will saturate thereby causing halation so that adjoining bright lines will become more likely to be joined together, making the linear pattern indistinct in a pixel region of the picked-up image corresponding to the elements that receive specularly reflected light and the elements in the surroundings thereof. Further, if the sensitivity of the camera is reduced too low such that the liner pattern will not be indistinct, the output signal intensity of an element other than the element that receives specularly reflected light become insufficient, and therefore the density of the pixels corresponding to the elements whose output signal intensity is insufficient declines in a picked-up image, resulting in a linear pattern whose bright lines are hard to be discriminated.

Further, as a light source for making up the projector, generally a halogen lamp or a metal halide lamp which has a high output of not less than 1 kW is used. Since such a light source has a large housing, the size of the light source itself becomes large and besides, since the light source generates heat, a strong cooling mechanism such as a water cooling mechanism and a large-scale blower (air blower) will become necessary, thus resulting in a large-scaled projector.

The present invention has been made to solve the problems of conventional art as described so far, and has its first object to provide a method for measuring the flatness of a sheet material such as a steel sheet travelling in the lengthwise direction, which allows the measurement of the flatness of the sheet material without needing a large-scaled measurement apparatus. Further, it is a second object to provide a method which allows accurate measurement of the flatness of a sheet material even when image pickup device is disposed at a location where it can receive the specularly reflected light of a bright and dark pattern projected onto the surface of a sheet material having a high specular reflectivity.

Recently, LEDs (=Light Emitting Diode) called as power LEDs, which can emit a high intensity light by the passage of a large current, have been developed, and those having a light-emitting efficiency (=light emission intensity/input power) of not less than 80 lm/W which is at an equal level with a metal halide lamp have become available. At present, since the input power to a power LED in which the size of one element is about 1 mm square can be about 1 W, it is possible to make the light emitting intensity per unit area of the power LED be not less than 80 lm/mm².

On the other hand, if it is assumed that in a projector including a conventional slide, the entire light emitted from a metal halide lamp having an rated power of 2.5 kW with a total luminous flux of 240,000 lm (for example, HMI 2500 W/SE manufactured by OSRAM AG.) is projected via a slide of a rectangle of 100 mm×80 mm (an area of 8000 mm²), the light emitting intensity per unit area of the slide will be 30 lm/mm².

That, is, evaluating the power LED as one single element, the light emitting intensity per unit area thereof will be more than that on the slide surface in a projector including a metal, halide lamp. This means that using the light emitted from an LED light source such as a power LED in which a plurality of LEDs are disposed at a predetermined pitch respectively in the longitudinal and lateral directions as a bright and dark pattern makes it possible to project a bright and dark pattern, which is more luminous than that projected by using a metal halide lamp of an rated power of 2.5 kW.

When the light emitted from an LED light source in which a plurality of LEDs are disposed at a predetermined pitch respectively in the longitudinal and lateral directions is used as a bright and dark pattern, not only a more luminous bright and dark pattern is obtained, but also the following advantages (a) to (e) can be achieved.

(a) When the light emitted from an LED light source is used as a bright and dark pattern, the LED light source will become very compact since it can be made up of a substrate on which a plurality of LEDs are disposed, and a cooling mechanism therefor (a heatsink and a cooling fan) can be realized in a size of about 10 cm square. On the other hand, a bright and dark pattern is projected by using a projector including a metal halide lamp having a rated power of order of kW, since in addition to that the metal halide lamp itself has a length of about 20 cm, the reflector that orients the light emitted from this lamp will be large, the light source will become very large so that even a compact one will be not smaller than 30 cm square.

(b) When the light emitted from an LED light source is used as a bright and dark pattern, since there is no loss in light quantity in the dark part of the slide, unlike the case where a projector including a conventional slide is used (for instance, when a linear pattern is projected, a half of the light quantity is wasted), it is possible to project the same pattern with a smaller input power, which is effective.

(c) As the LED for making up an LED light source, an LED that emits light of a single wavelength such as blue, green, and red lights can be appropriately chosen. For example, when a bright and dark pattern is projected onto the surface of a steel sheet in a state of high temperature immediately after rolling, disposing a bandpass filter, which passes only light having a wavelength close to the emission wavelength of the LED, in front of the image pickup device will allow the acquisition of an image of the bright and dark pattern in which, the effects of the radiant light emitting from the surface of steel sheet in the state of high temperature are suppressed to be minimum. Particularly, when a bright and dark pattern is projected onto the surface of a steel sheet in a state of high temperature, it is effective to apply an LED that emits blue light.

(d) Since an LED has a fast responsiveness, using a two-dimensional camera with an electronic shutter as the image pickup device and lighting the LED in synchronous with the electronic shutter allows the suppression of the heat generation of the LED.

(e) When the light emitted from an LED light source is used as a bright and dark pattern, since the bright part of the bright and dark pattern is formed by the light emitted from each LED, adjusting the input power to each LED (adjusting the value of current to be applied to each LED) allows the brightness of the bright and dark pattern to be easily changed from place to place.

The present invention has been completed by the present inventors paying attention to the above described advantages of LED light source. In order to achieve the above described first object, the present invention provides a method for measuring a flatness of a sheet material, comprising: projecting a bright and dark pattern made up of bright parts and dark parts onto a surface of a sheet material travelling in a lengthwise direction; picking up an image of the bright and dark pattern with image pickup device to acquire a pattern image, the image pickup device having a field of view larger than a width of the sheet material; and analyzing the acquired pattern image to measure the flatness of the sheet material, wherein a bright and dark pattern in which a bright part is disposed at a predetermined set pitch respectively in longitudinal and lateral directions is formed by light emitted from an LED light source including a plurality of LEDs disposed at a predetermined pitch respectively in the longitudinal and lateral directions, and the bright and dark pattern is projected onto the surface of the sheet material such that the longitudinal direction of the bright and dark pattern lies along a lengthwise direction of the sheet material, and the lateral direction of the bright and dark pattern lies along a width direction of the sheet material.

According to the present invention, since an LED light source in which a plurality of LEDs are disposed at a predetermined pitch respectively in the longitudinal and lateral directions is used as the light source to project a bright and dark pattern on the surface of a sheet material, it is possible to measure the flatness of the sheet material without needing a large-scaled measurement apparatus.

It is noted that the "LED light source including a plurality of LEDs disposed at a predetermined pitch respectively in the longitudinal and lateral directions" in the present invention includes both of an LED light source including a plurality of LEDs arranged in a matrix form (a plurality of LEDs disposed at a predetermined pitch on a straight line extending in the longitudinal direction, and disposed at a predetermined pitch on a straight line extending in the lateral direction), and an LED light source including a plurality of LEDs disposed in a staggered form at a predetermined pitch respectively in the longitudinal and lateral directions. The above described LED light source including a plurality of LEDs arranged in a matrix form also includes an LED light source in which LEDs are disposed without a gap in the lateral direction (when the light emitted from this LED light source is used as a bright and dark pattern, the bright and dark pattern will become a linear pattern).

Further, "a plurality of LEDs disposed at a predetermined pitch" in the present invention do not necessarily require that all the LEDs are disposed at a fixed pitch, and may partly include LEDs which are disposed at a pitch different from that of others. However, as will be described later, it is preferable that LEDs are disposed at a fixed pitch at least in the longitudinal direction to determine the distribution of longitudinal pitches of the bright part of the bright and dark pattern by applying a frequency analysis method.

Further, in the present invention, a "set pitch" means a value obtained by projecting the spacing between bright parts of the bright and dark pattern in the image pickup direction when it is assumed that the surface shape of the sheet material onto which the bright and dark pattern is projected is perfectly flat. Particularly, a "longitudinal set pitch" means the spacing in the longitudinal direction between bright parts adjacent along the longitudinal direction of the bright and dark pattern (which means bright parts adjacent linearly along the longitudinal direction of the bright and dark pattern when an LED light source including a plurality of LEDs disposed in a matrix form is used; and means bright parts adjacent in a staggered manner along the longitudinal direction of the bright and dark pattern when an LED light source including a plurality of LEDs disposed in a staggered manner is used). Further, a "lateral set pitch" means the spacing in the lateral direction between bright parts adjacent along the lateral direction of the bright and dark pattern (which means bright, parts adjacent linearly along the lateral direction of the bright and dark pattern when an LED light source including a plurality of LEDs disposed in a matrix form is used; and means bright parts adjacent in a staggered manner along the lateral direction of the bright and dark pattern when an LED light source including a plurality of LEDs disposed in a staggered manner is used).

Here, when the bright and dark pattern to be projected to the surface of the sheet material is a linear pattern with a small pitch, as a countermeasure to avoid the tendency of the linear pattern to be indistinct in the pixel region corresponding to the element that receives specularly reflected light and elements in the surroundings thereof, if the image pickup device is disposed at a position where it can receive the specularly reflected light, it is conceivable (1) to adopt a camera with a wide dynamic range as the image pickup device such that the output signal intensity of an element that does not receive the specularly reflected light will not become insufficient even if the sensitivity of the image pickup device is reduced, and (2) to increase the pitch of the linear pattern.

However, as for the above described countermeasure (1), it may not be applied easily due to problems such as that although a dynamic range of not less than 12 bits (4098 levels) can be obtained by using a digital camera which has become widespread use in recent years, the wiring length is restricted and the cost of the camera increases.

Moreover, as for the above described countermeasure (2), simply increasing the pitch of the linear pattern (see FIG. 3B) will lead to deterioration of the measurement accuracy of surface shape, and thus the measurement accuracy of flatness due to the decline of measurement resolution (spatial resolution) of surface shape.

Accordingly, having paid attention to the above described advantage (e) of LED light source, the present inventors have come to an idea that decreasing the brightness of the bright part resulting from specularly reflected light received by the image pickup device to be lower than that of the bright part not resulting from specularly reflected light received by the image pickup device will make the bright and dark pattern not likely to be indistinct, and further allow accurate measurement of the surface shape, and thus, the flatness of the sheet material without deterioration of measurement resolution even if the image pickup device is disposed at a location where it can receive the specularly reflected light of the bright and dark pattern projected onto the surface.

In order to achieve the above described second object in addition to the above described first object, if the image pickup device is disposed, at a location where the image pickup device can receive light of the bright and dark pattern specularly reflected at the surface of the sheet material, among current values to be applied to each LED included in the LED light source, the current value to be applied to an LED corresponding to a bright part resulting from specularly reflected light received by the image pickup device is preferably set to be minimum.

For example, when a central portion of the pattern image acquired by the image pickup device is the pixel region corresponding to the element of the image pickup device that receives specularly reflected light from the bright part of the blight and dark pattern, the current, value to be applied to the LED corresponding to the bright part in the central portion of the pattern image can be minimised to avoid the tendency of the bright and dark pattern to be indistinct in the pattern image and to further allow accurate measurement of the surface shape, and thus, the flatness of the sheet material without deterioration of measurement resolution.

It is noted that "setting the current value to be applied to the LED corresponding to the bright part resulting from specularly reflected light received to be minimum" in the present invention means not that the current value to be applied to the concerned LED (LED corresponding to the bright part resulting from specularly reflected light received) is made closer to 0, but that the current value to be applied to the concerned LED is set to be the smallest value among the current: values to be applied to each LED included in the LED light source such that the light emitting intensity of the concerned LED is lower than that of other LEDs.

Preferably, a two-dimensional camera with an electronic shutter which can set an exposure timing and an exposure time is used as the image pickup device, and a lighting timing and a lighting time of the LED are respectively made synchronous with an exposure timing and an exposure time set in the two-dimensional camera with the electronic shutter.

According to such preferable method as this, since the lighting timing and the lighting time of LED are respectively synchronous with the exposure timing and the exposure time which are set in the two-dimensional camera with an electronic shutter, it is possible to suppress the heat generation of the LED compared with a ease where the LED is continuously lit.

Further, in order to achieve the above described second object in addition to the above described first object, the present inventors have conducted a diligent study, eventually coming to an idea that as the bright and dark pattern to be projected onto the surface of sheet material, a staggered pattern in which bright parts are disposed in a staggered manner in the longitudinal and lateral directions respectively at a predetermined set pitch (a set pitch $P_L$ in the longitudinal direction and a set pitch $P_W$ in the lateral direction) is used and projected onto the surface of the sheet material such that the longitudinal direction of the staggered pattern lies along the lengthwise direction of the sheet material, and the lateral direction lies along the width direction, as shown in FIG. 3C. Since using this staggered pattern will result in that since the bright parts are disposed in a staggered manner in the longitudinal and lateral directions, the distance between bright parts linearly adjacent in the longitudinal direction will become larger than (two times of) the distance $P_L'$ between bright parts (for example, bright parts M1 and M2) adjacent linearly in the longitudinal direction in a conventional linear pattern even if the set pitch $P_L$ of the bright part in the longitudinal direction is the same as the set pitch $P_L'$ of a conventional linear pattern (FIG. 3A), and therefore the spacing between bright parts expands. As for the lateral direction, while the bright part is continuous in a conventional linear pattern, bright parts (for example, bright parts M1 and M3) which are adjacent linearly in the lateral direction have a spacing in the staggered pattern. For this reason, there is an advantage that the bright and dark pattern is not likely to be indistinct even in a pixel region corresponding to the elements of the image pickup device that receives specularly reflected light.

However, even if a staggered pattern is used as the bright and dark pattern to be projected onto the surface of a sheet material, if the surface shape of the sheet material is calculated simply based on the density distribution of pixels on the shape measurement line L1 extending along the lengthwise direction, of the sheet material (the longitudinal direction of the staggered pattern) as in a conventional method, the measurement resolution (spatial resolution) of surface shape will decline since the spacing between bright parts which are adjacent in a liner manner in the longitudinal direction.

Accordingly, the present inventors have further conducted a diligent study, and have paid attention to averaging of pixel densities on a straight line L2 which passes the pixels on the shape measurement line L1 and extends in the lateral direction of the staggered pattern, and has a length W not less than twice the lateral set pitch $P_W$ of bright part, and thereby calculating an average pixel density. For example, suppose that the pixel densities of bright, part of the staggered pattern are all 254, and the pixel densities of dark part are all 0. When it is supposed that the length W of the straight line L2 is twice the lateral set pitch $P_W$ of bright part (W=$2P_W$), and the number of pixels of bright part and that of dark part on the straight line L2 are the same, the average pixel density on the straight line L2 will be 127. Then, calculating the distribution of the average pixel density along the shape measurement line L1 (the longitudinal position of the straight line L2 is changed), the average pixel density distribution will be a distribution in which the average pixel density is 127 at a location where the straight line L2 passes a bright part, and is 0 at a location where the straight line L2 only passes dark parts, that is, a distribution having the same period as the set pitch $P_L$ of bright part in the longitudinal direction. La other words, the period $P_L$ of the average pixel density distribution will be the same as the period $P_L'$ of the pixel density distribution on the shape measurement ling L' for a conventional linear pattern (FIG. 3A). Therefore, calculating the surface shape of sheet, material based on the above described average pixel density distribution will make it possible to obtain a measurement resolution of the same level as in the case where a conventional linear pattern is used without deterioration of the measurement resolution (spatial resolution) of surface shape with respect to the longitudinal direction of the staggered pattern (the lengthwise direction of sheet material). It is noted that the amplitude of the average pixel density distribution when a staggered pattern is used will decline compared with the amplitude of the pixel density distribution when a linear pattern is used. However, if the length W of the straight line L2 for which averaging is performed is made to be a length not less than twice the lateral set pitch $P_W$ of bright part, since a bright part will be necessarily present on the straight line L2, the amplitude of the average pixel, density distribution will be, even if it declines, about ½ of that when the linear pattern is used, and thus no problem will result. Further, although the measurement resolution (spatial, resolution) of surface shape for the lateral direction of the staggered pattern (the width direction of sheet material) will deteriorate according to the length W of the straight line L2, since a hot-rolled steel sheet, which is a major target for the application of the present invention, does not exhibit an abrupt shape change in the width direction, no problem will arise unless W is made extremely large.

As so far described, the present inventors have come to an idea that the surface shape of sheet material according to the following procedures (A) to (C) can be calculated to avoid the bright and dark pattern to be indistinct and to further allow accurate measurement of the surface shape, and thus, the flatness of the sheet material without deterioration of measurement resolution even if the image pickup device is disposed at a location where it can receive the specularly reflected light of the bright and dark pattern projected, onto the surface.

(A) A staggered pattern in which bright parts are disposed in a staggered manner at a predetermined set pitch respectively in the longitudinal and lateral directions is used as the bright and dark pattern to be projected onto the surface of sheet material, and is projected onto the surface of sheet material such that the longitudinal direction of the staggered pattern lies along the lengthwise direction of sheet material and the lateral direction thereof lies along the width direction of sheet material.

(B) Pixel densities on a straight line which passes pixels on the shape measurement line extending along the longitudinal direction of the staggered pattern (the lengthwise direction of sheet material) and extends in the lateral direction of the staggered pattern (the width direction of sheet material), and which has a length not less than twice the lateral set pitch of bright part are averaged to calculate an average pixel density.

(C) The distribution of the above described average pixel density along the shape measurement line is calculated, and the surface shape of sheet material along the shape measurement line is calculated based on the average pixel density distribution.

According to the above idea of the present inventors, in order to achieve the above described second object in addition to the above described first object, the present invention preferably comprises the following first-sixth steps.

(1) a first step: forming a staggered pattern in which a bright part is disposed at a predetermined set pitch respectively in longitudinal and lateral directions by light emitted from an LED light source including a plurality of LEDs disposed in a staggered manner at a predetermined pitch respectively in the longitudinal and lateral directions, and projecting the staggered pattern onto the surface of the sheet material such that the longitudinal direction of the staggered pattern lies along a lengthwise direction of the sheet material, and the lateral direction of the staggered pattern lies along a width direction of the sheet material (2) a second step: disposing the image pickup device at a location where the image pickup device can receive light of the staggered pattern specularly reflected at the surface of the sheet material, and acquiring the pattern image by picking up an image of the staggered pattern with the image pickup device (3) a third step: setting a shape measurement line extending along the longitudinal direction of the staggered pattern at a predetermined location in the acquired pattern image (4) a fourth step: averaging pixel densities on a straight line which passes pixels on the shape measurement line and extends in the lateral direction of the staggered pattern, and which has a length not less than twice the lateral set pitch of the bright part and calculating an average pixel density (5) a fifth step: calculating a distribution of the average pixel density along the shape measurement line (6) a sixth step: calculating a surface shape of the sheet material along the shape measurement line based on the calculated average pixel density distribution, and computing a flatness of the sheet material based on the calculated surface shape According to a preferable method such as this, even when image pickup device is disposed at a location where it can receive the specularly reflected light of a bright and dark pattern projected onto the surface, the bright and dark pattern is not likely to be indistinct, and further the surface shape that is, in turn, the flatness of sheet material can be accurately measured without deterioration of measurement resolution.

Moreover, according to the above described preferable method, advantages described below are also conceivable. Upon fabricating an LED light source by disposing a plurality of LEDs on a substrate having a limited area, generally, securing a wiring space for driving LEDs becomes an issue. In order to perform efficient wiring on a substrate having a limited area, it is preferable to dispose a plurality of LEDs in a matrix form, and to connect in series each LED aligned straight along the longitudinal or lateral direction. However, connecting a large number of LEDs in series will result in that the input voltage of the entire LEDs connected in series becomes too high, and thus a required, direct-current power supply becomes expensive. Further, as described above, when a two-dimensional camera with, an electronic shutter is used as the image pickup device, and the LED is lit in synchronous with the electronic shutter (when the LED is driven to flash), a problem may also arise in that a relay etc. to be used for the flashing is not available because of limitation in withstanding voltage. Disposing LEDs in a staggered manner as in the above described method allows the number of LEDs aligned straight along the longitudinal or lateral direction to be reduced to a half of the case when LEDs are disposed in a matrix form, making it easy to avoid the problem as described above. For example, the same measurement resolution as when the LEDs are (disposed in a matrix form such that 30 LEDs are aligned in the longitudinal direction can be realized only by aligning 15 LEDs in the longitudinal direction when the LEDs are disposed in a staggered manner. When 30 blue LEDs are connected in series, since the input voltage per one LED is 3 to 4 V, the input voltage for all the LEDs connected in series will become as high as 90 to 120 V. On the other hand, when the number of LEDs is halved to be 15, the input voltage for all the LEDs may also be halved to be 45 to 60 V, which is advantageous.

Here, in the above described sixth step, to calculate the surface shape of the sheet material along the shape measurement line based on the average pixel density distribution along the shape measurement line, to be specific, first, the distribution of longitudinal pitch $p_m(x)$ of bright part of the staggered pattern along the shape measurement line may be calculated based on the average pixel density distribution along the shape measurement line (for example, by applying a known phase analysis method to the average pixel density distribution). The relationship between the longitudinal pitch $p_m$ of bright part of the staggered pattern and the inclination angle $\theta$ of the surface of the sheet material can be geometrically determined. Therefore, calculating the distribution of longitudinal pitch $p_m(x)$ of bright part of the scattered pattern along the shape measurement line makes it possible to calculate the distribution of inclination angle $\theta(x)$ of the surface of the sheet material along the shape measurement line based on the distribution of longitudinal pitch $p_m(x)$ of bright part and the above described relationship.

FIG. 4 is a schematic diagram showing the relationship between a longitudinal pitch $p_m$ of bright part of a staggered pattern and an inclination angle $\theta$ of the surface of sheet material. FIG. 4 shows an example of a sheet material traveling in a horizontal direction. In FIG. 4, $\theta$ stands for an inclination angle formed by the traveling direction of a sheet material (the horizontal direction) and the surface of the sheet material; $\alpha$ stands for an angle formed by the direction normal to the traveling direction of the sheet material (the vertical direction) and the image pickup direction by the image pickup device; and $\beta$ stands for an angle formed by the direction normal to the traveling direction of the sheet material (the vertical direction) and the projection direction of the staggered pattern. Further, $p_m$ stands for a longitudinal pitch of bright part of the staggered pattern in the pattern image acquired for the sheet material, and $p_{m0}$ stands for a value of $p_m$ projected in the direction normal to the traveling direction of the sheet material (the vertical direction). Further, $p_s$ stands for a longitudinal pitch of bright part of the staggered pattern in a pattern image acquired on a reference material which is placed in parallel with the traveling direction of sheet material (placed horizontally) and has a flat surface shape, and $p_{s0}$ stands for a value of $p_s$ projected in the vertical direction.

Among $\theta$, $\alpha$, $\beta$, $p_m$, $p_{m0}$, $p_s$ and $p_{s0}$, the following Formulas (4) to (6) hold geometrically.

$$\tan\theta = \frac{(p_{m0}/p_{s0}) - 1}{(p_{m0}/p_{s0})\tan\beta} \qquad (4)$$

$$p_{s0} = \frac{p_s}{\cos\alpha} \qquad (5)$$

$$p_{s0} = \frac{p_m \cos\theta}{\cos(\alpha - \theta)} \qquad (6)$$

Substituting the above described Formulas (5) and (6) into Formula (4) proves that Formula (7) also holds.

$$\tan\theta = \frac{(p_m/p_s) - 1}{\tan\alpha + (p_m/p_s)\tan\beta} \qquad (7)$$

From the above described Formula (7), the following Formula (8) holds.

$$\theta = \tan^{-1}\left\{\frac{(p_m/p_s) - 1}{\tan\alpha + (p_m/p_s)\tan\beta}\right\} \qquad (8)$$

Therefore, the distribution of the inclination, angle $\theta(x)$ of the surface of a sheet material along a shape measurement line can be calculated by the following Formula (1).

$$\theta(x) = \tan^{-1}\left\{\frac{(p_m(x)/p_s(x)) - 1}{\tan\alpha + (p_m(x)/p_s(x))\tan\beta}\right\} \qquad (1)$$

In the above described Formula (1), x stands for the position along the longitudinal direction of the staggered pattern in the pattern image (the position along the lengthwise direction of sheet material); $\theta(x)$ stands for the distribution of inclination angle formed by the traveling direction of the sheet material (the horizontal direction) and the surface of the sheet material; $\alpha$ stands for an angle formed by the direction normal to the traveling direction of the sheet material (the vertical direction) and the image pickup direction by the image pickup device; and $\beta$ stands for an angle formed by the direction normal to the traveling direction of the sheet material (the vertical direction) and the projection direction of the staggered pattern.

Preferably, as the LED, an LED that emits light of a single wavelength different from a peak wavelength of radiant light emanating from the sheet material is used, and a bandpass filter that passes only light having a wavelength close to the emission wavelength of the LED is disposed in front of the image pickup device.

According to such preferable method as this, for example, even if the sheet material is a steel sheet in a state of high temperature immediately after rolling, it is possible acquire a pattern image in which the effects of radiant light emanating from the surface of the steel sheet are suppressed to be minimum.

The present invention also provides a method for manufacturing a steel sheet, comprising rough-rolling a billet with a roughing-down mill, rolling the billet with a finish rolling mill train, and thereafter cooling the billet in a cooling zone to manufacture a steel sheet, wherein a rolling condition of the finish-rolling mill train or a cooling condition in the cooling zone is controlled based on a result of measuring a flatness of a steel sheet as the sheet material by the method for measuring a flatness.

According to the present invention, it is possible to measure the flatness of a sheet material without requiring a large-scaled measurement apparatus. Further, according to the present invention, even when image pickup device is disposed at a location where it can receive the specularly reflected light of a bright and dark pattern projected onto the surface of a sheet material having a high specular reflectivity, it is possible to accurately measure the surface shape of the sheet material, and thereby allowing accurate measurement of the flatness of the sheet material.

BRIEF DESCRIPTION OF DRAWINGS

FIG. 2 is an explanatory diagram to illustrate the range in which a camera can receive specularly reflected light of the projected light from a projector.

FIG. 3 (FIGS. 3A, 3B and 3C) is an explanatory diagram to illustrate by comparison various bright and dark patterns.

FIG. 9 (FIGS. 9A and 9B) is a diagram showing an arrangement example of the LEDs on each substrate shown in FIG. 8.

FIG. 15 (FIGS. 15A, 15B and 15C) shows the result of verifying the measurement accuracy of inclination angle by the flatness measurement apparatus shown in FIG. 5 by using a sample for inclination angle measurement.

DESCRIPTION OF EMBODIMENTS

Hereafter, appropriately referring to appended drawings, embodiments of the present invention will be described taking example of a case in which the sheet material is a hot-rolled steel sheet, and the flatness (steepness) is measured at the exit side of a finish-rolling mill train of a hot-rolled steel sheet manufacturing line.

A. First Embodiment

<A-1. General Configuration of Flatness Measurement Apparatus>

Figure 1:
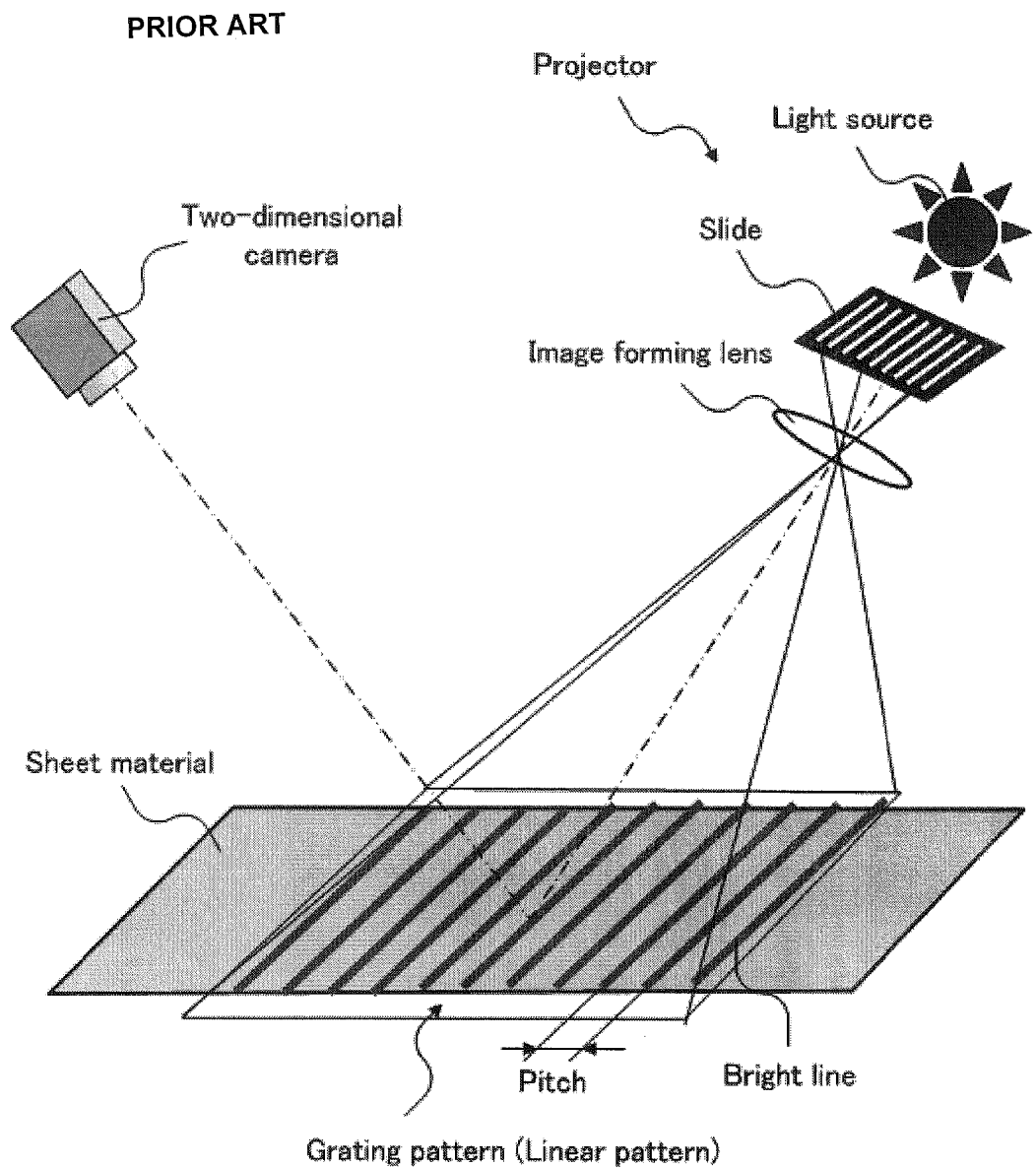
FIG. 1 is a diagram to schematically show a configuration example of the apparatus for performing a grating pattern projection method.
Figure 4:
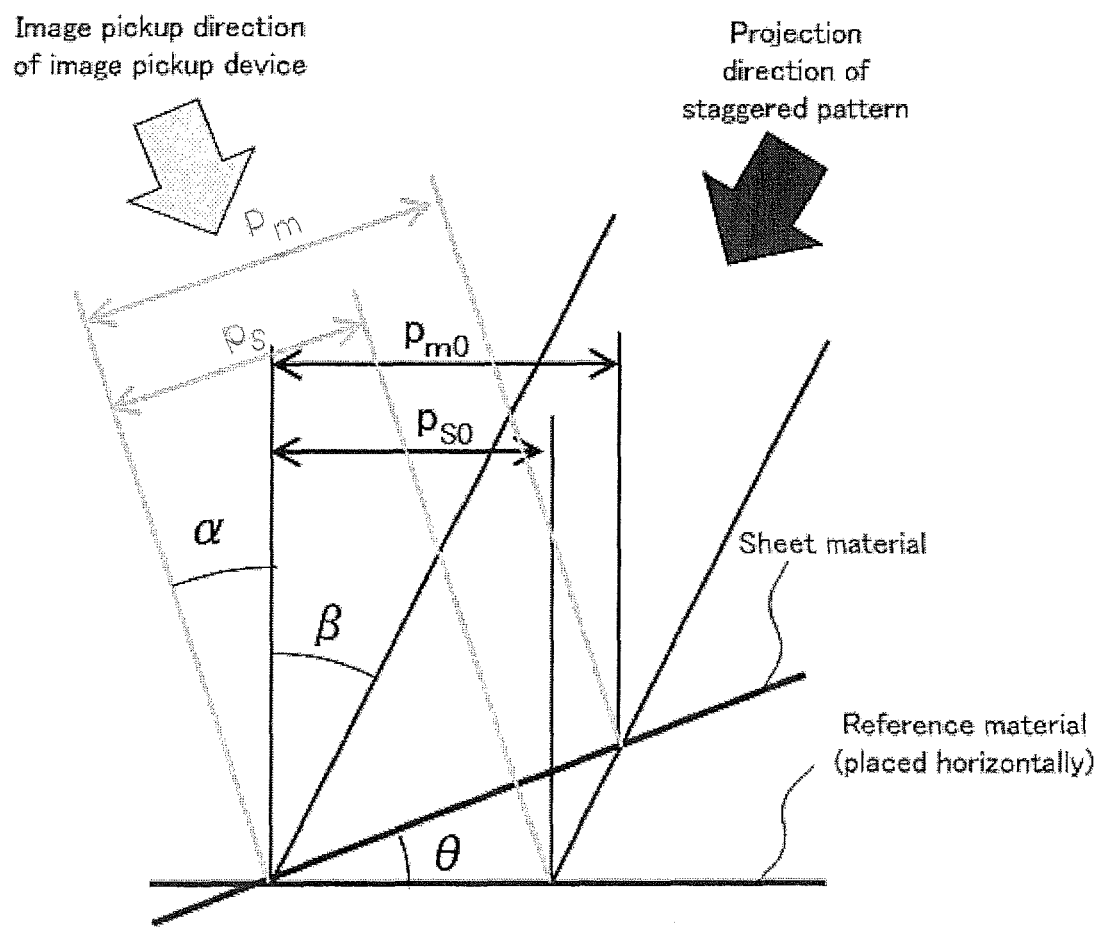
FIG. 4 is a schematic diagram showing the relationship between a longitudinal pitch $p_m$ of bright part of a staggered pattern and an inclination angle θ of the surface of sheet material.
Figure 5:
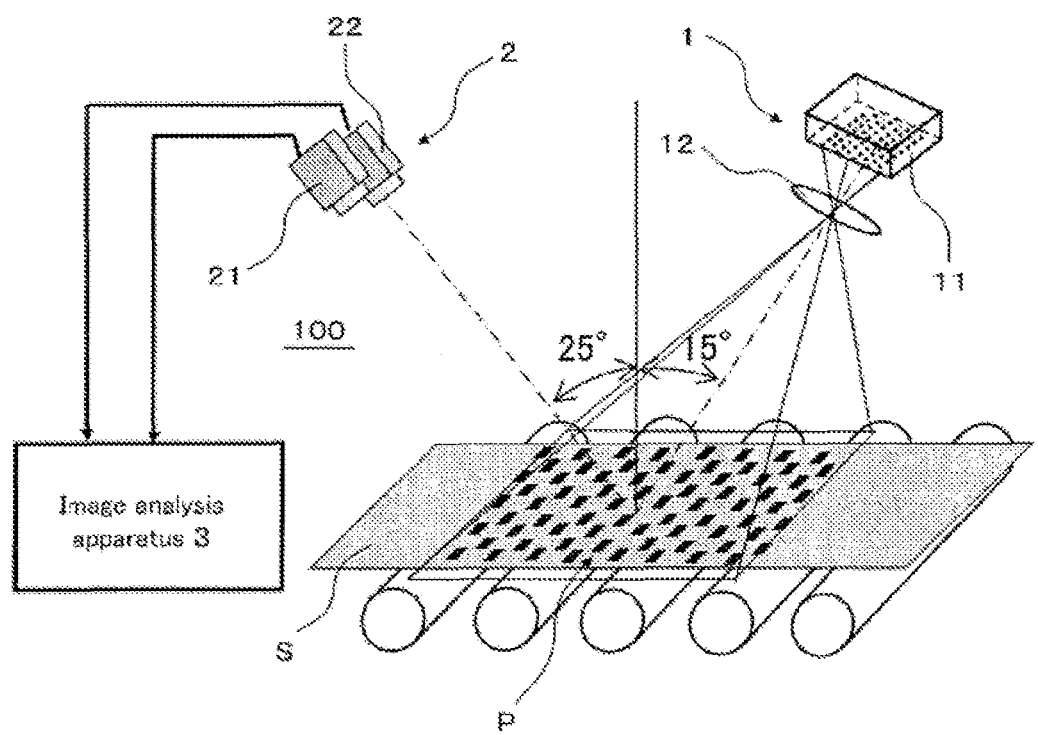
FIG. 5 is a schematic diagram showing an outline configuration example of a flatness measurement apparatus for performing a method for measuring flatness relating to the present invention.
Figure 6:
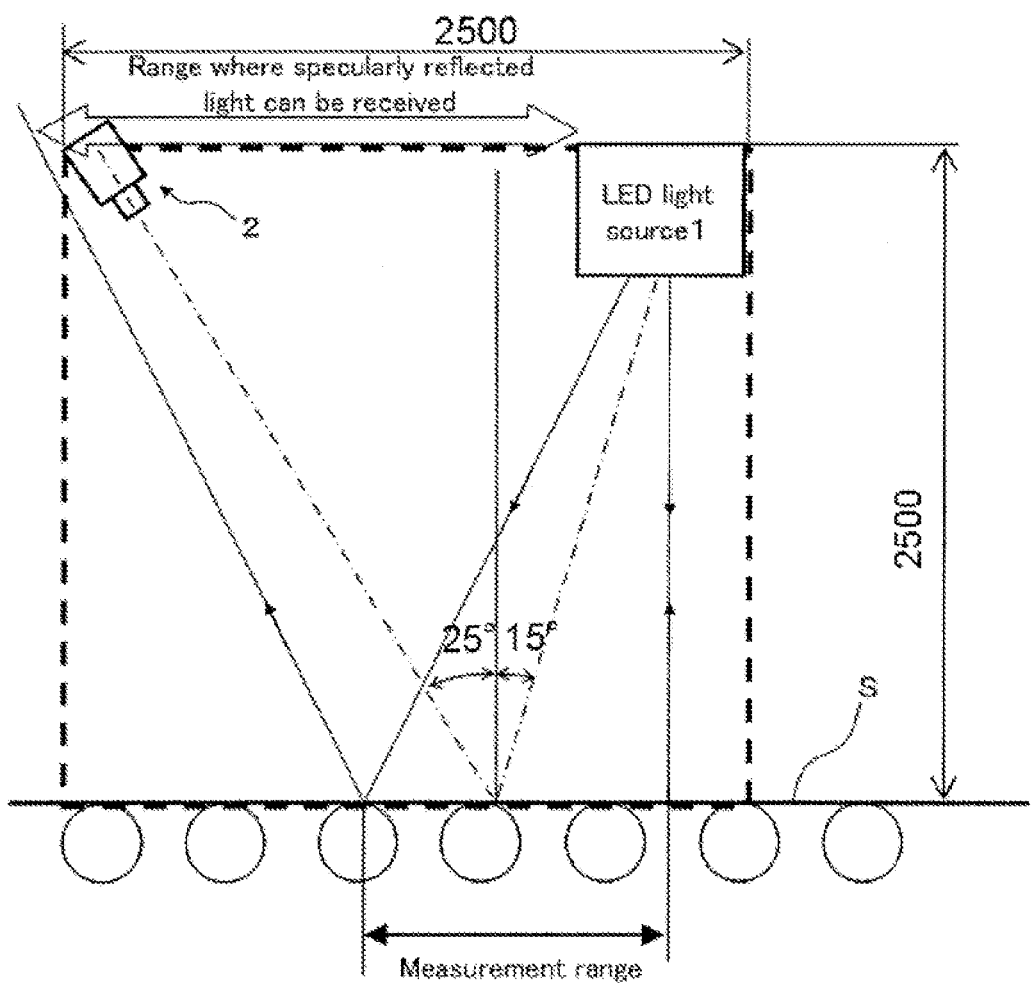
FIG. 6 is a schematic diagram showing an installation condition of the flatness measurement apparatus shown in FIG. 5.

FIG. 5 is a schematic diagram showing an outline configuration example of a flatness measurement apparatus for performing a method for measuring flatness relating to the present invention. FIG. 6 is a schematic diagram showing an installation condition of the flatness measurement apparatus shown in FIG. 5. As shown in FIGS. 5 and 6, a flatness measurement apparatus 100 of the present embodiment includes an LED light source 1 for projecting a staggered pattern P as a bright and dark pattern onto the surface of a hot-rolled steel sheet S traveling horizontally in the lengthwise direction such that the longitudinal direction of the staggered pattern P lies along the lengthwise direction of the hot-rolled steel sheet S, and the lateral direction of the staggered pattern P lies along the width direction of the hot-rolled steel sheet S; image pickup device 2 having a field of view larger than a width of the hot-rolled steel sheet S and for picking up an image of the staggering pattern P projected onto the surface of the hot-rolled steel sheet S to acquire a pattern image; and an image analysis apparatus 3 for analyzing the pattern image acquired by the image pickup device 2.

As shown in FIG. 6, since the installation space at the exit side of the finish-rolling mill train in which the flatness measurement apparatus 100 of the present embodiment is installed is only 2.5 m in the lengthwise direction of the hot-rolled steel sheet S and 2.5 m in the vertical direction, in order to ensure a measurement range (field of view) of at least 1 m in the lengthwise direction of the hot-rolled steel sheet S, the image pickup device 2 must be disposed at a location where it can receive specularly reflected light of the projected light from the LED light source 1 (specularly reflected light of the staggered pattern P). In the present embodiment, an image of the staggered pattern P is projected at an angle of 15° from diagonally above with respect to the hot-rolled steel sheet S (the angle formed by the vertical direction and the projection direction of the staggered pattern P) by using the LED light source 1, and an image of the projected staggered pattern P is picked up at angle of 25° from diagonally above with respect to the hot-rolled steel sheet S (the angle formed by the vertical direction and the image pickup direction) by using the image pickup device 2.

Figure 7:
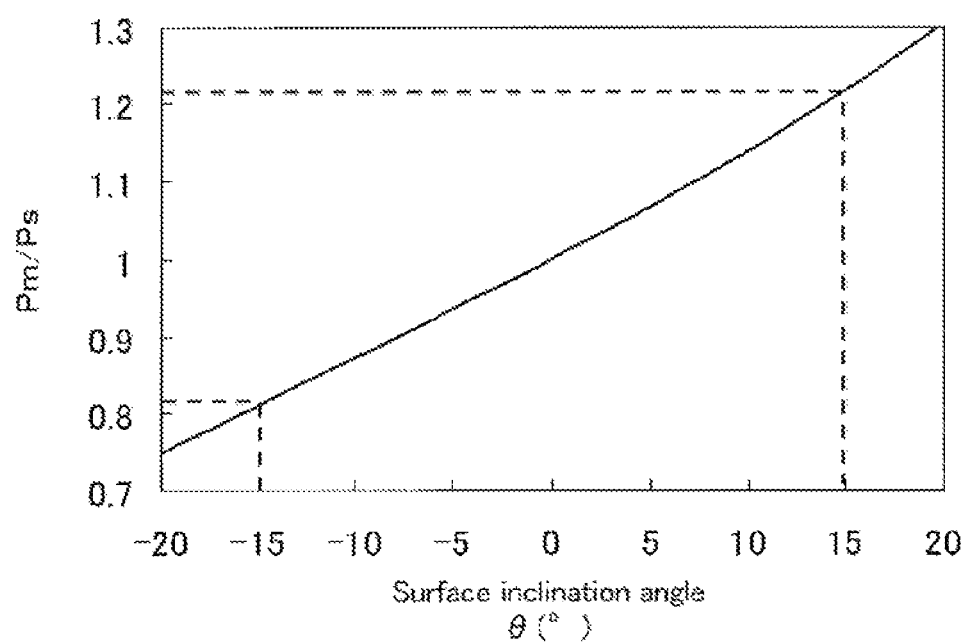
FIG. 7 is a graph showing the relationship between $p_m/p_s$, and the inclination angle θ of the surface of the hot-rolled steel sheet under the installation condition according to one embodiment of the present invention.

FIG. 7 is a graph showing the relationship between $p_m/p_s$ and the inclination angle θ of the surface of the hot-rolled steel sheet S under the above described installation condition. Here, as described above, $p_m$ stands for a longitudinal pitch of bright part of the staggered pattern P in the pattern image acquired for the hot-rolled sheet material S; $p_s$ stands for a longitudinal pitch of bright part of the staggered pattern in a pattern image acquired for a reference material which is placed horizontally and has a flat surface shape; and θ stands for an inclination angle formed by the horizontal direction and the surface of the hot-rolled steel sheet S. The measurement range of the inclination angle θ of the surface of the hot-rolled steel sheet S is determined by the sum of a required flatness (steepness) measurement range and a range of inclination angle of the entire surface of the hot-rolled steel sheet S which may occur during measurement. In the present embodiment, the required measurement range of steepness is −5% to +5% (which corresponds to −9% to +9% when converted into the inclination angle of the surface of the hot-rolled steel sheet S), and considering the variation range of the inclination angle of the entire surface of the hot-rolled steel sheet S associated with fluttering of the hot-rolled steel sheet S, the measurement range of the inclination angle θ of the surface of the hot-rolled steel sheet S is determined to be −15° to +15°. From FIG. 7, when the inclination angle of the surface of the hot-rolled steel sheet S varies in a range of −15° to +15°, $p_m/p_s$ will vary in a range of (0.81 to 1.22.

<A-2. Configuration of LED Light Source>

Figure 8:
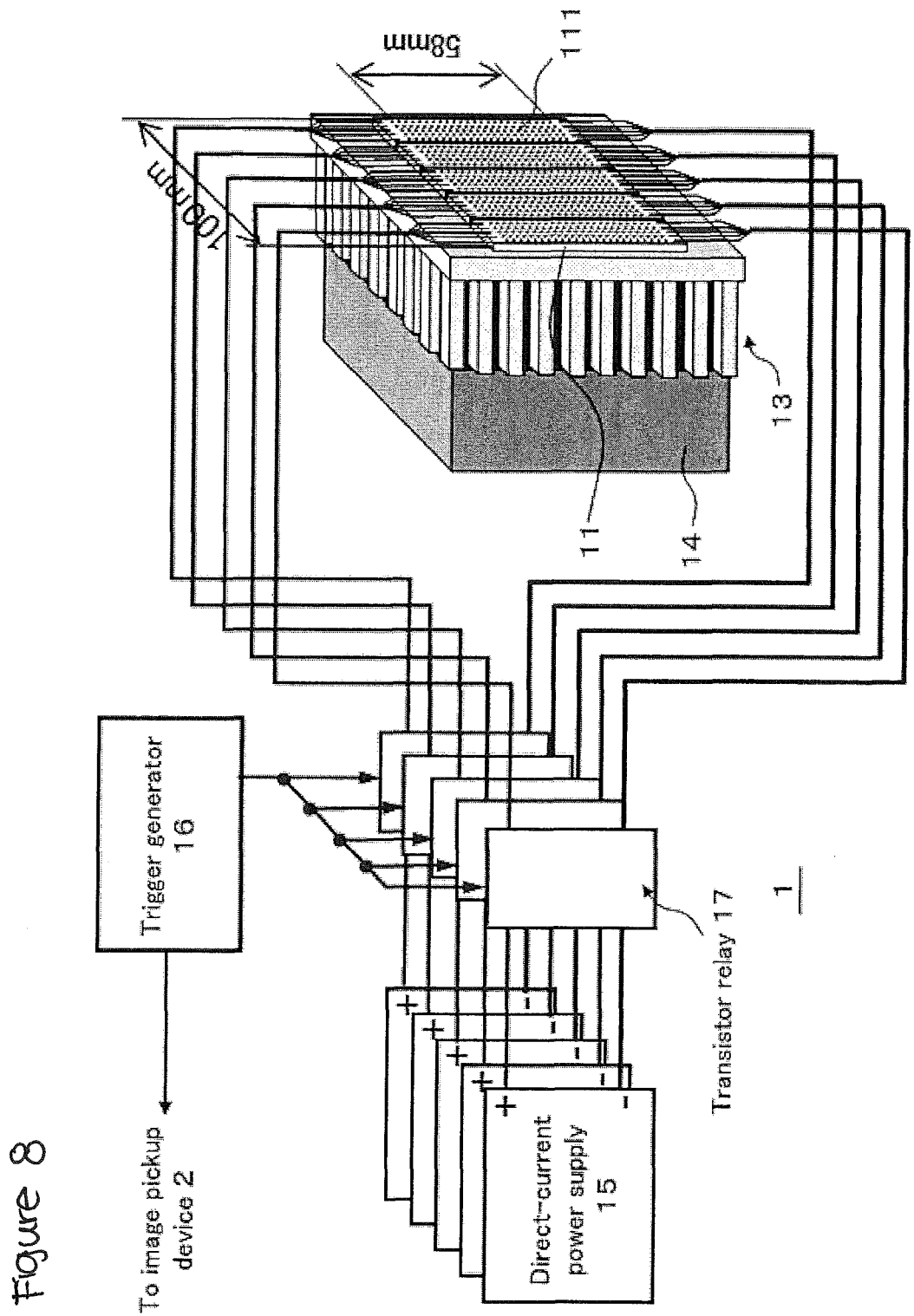
FIG. 8 is a schematic diagram showing an outline configuration of an LED light source shown in FIG. 5.

FIG. 8 is a schematic diagram showing an outline configuration of an LED light source 1 of the present embodiment. As shown in FIG. 8, the LED light source 1 of the present embodiment includes a substrate 11 in which a plurality of LEDs 111 each of which emits blue light are disposed in a staggered manner; an image-forming lens 12 (see FIG. 5) disposed on the front side of the substrate 11; a heatsink 13 and a cooling fan 14 as a cooling mechanism; and a direct-current power supply 15 that inputs power to the LEDs 111. In the present embodiment, five substrates 11 are aligned so as to lie along a direction in parallel with the width direction of the hot-rolled steel sheet S, and bonded onto the heatsink 13. The reason why the LEDs 111 are not disposed on one substrate 11, but are dividedly disposed on five substrates 11 is to make it unnecessary to replace the whole substrate in which all the LED 111 are disposed when part of the LEDs 111 fails. That is, to make it enough to replace only the substrate 11 in which the failed LED 111 is disposed. Moreover, in the present embodiment, five direct-current power supplies 15 are also provided such that power can be input to every substrate 11. As a result, the input power can be independently adjusted for each substrate 11, and therefore the brightness of the staggered pattern P can be adjusted (changed) for the width direction of the hot-rolled steel sheet S. It is noted that in the present embodiment, although an example in which input power can be adjusted for every substrate 11 is shown, but the present invention is not limited to this, and for example, configuration may be such that input power can be adjusted for every LEDs 111 disposed straight in the longitudinal direction of each substrate 11, or input power can be adjusted for every LED 111.

Moreover, the LED light source 1 of the present embodiment includes, as a preferable mode, a trigger generator 16 and a transistor relay (SSR=Solid State Relay) 17 having a fast responsiveness. In the present embodiment, five transistor relays 17 are provided, and each transistor relay 17 lies midway in the wiring for connecting each direct-current power supply 15 and the each substrate 11. The trigger generator 16 outputs a TTL trigger having a frequency of 40 Hz and a pulse width of 5 msec toward the transistor relay 17. When this TTL trigger is turned on, the direct-current power supply 15 and the substrate 11 are electrically connected by the transistor relay 17 so that power is input to the LED 111 disposed on the substrate 11 to make the LED 111 light up. When the TTL trigger is turned off, the direct-current power supply 15 and the substrate 11 are electrically disconnected by the transistor relay 17 so that the LED 111 disposed on the substrate 11 will light out. As so far described, the LED 111 is driven to flash at a high speed.

On the other hand, the trigger generator 16 outputs a TTL trigger toward the image pickup device 2 as well. The TTL trigger to be output to the image pickup device 2 is delayed by 1 msec in output timing from the TTL trigger to be output to the above described transistor relay 17, and has a pulse width of 4 msec. As described below, a two-dimensional camera with an electronic shutter is used as the image pickup device 2 of the present embodiment, and the TTL trigger output from the trigger generator 16 is used to turn on/off the electronic shutter of the image pickup device 2. That is, when the TTL trigger is On, the electronic shutter is opened (an image of the staggered pattern P is picked up), and when the TTL trigger is Off, the electronic shutter is closed (an image of the staggered pattern will not be picked up).

Since the configuration as described so far allows the light-up timing and light-up time of the LED 111 disposed on the substrate 11 to be in synchronous with the exposure timing and the exposure time set in the image pickup device 2, it is possible to suppress the heat generation of the LED 111 compared with a case where the LED 111 is continuously lit on.

Figure 10:
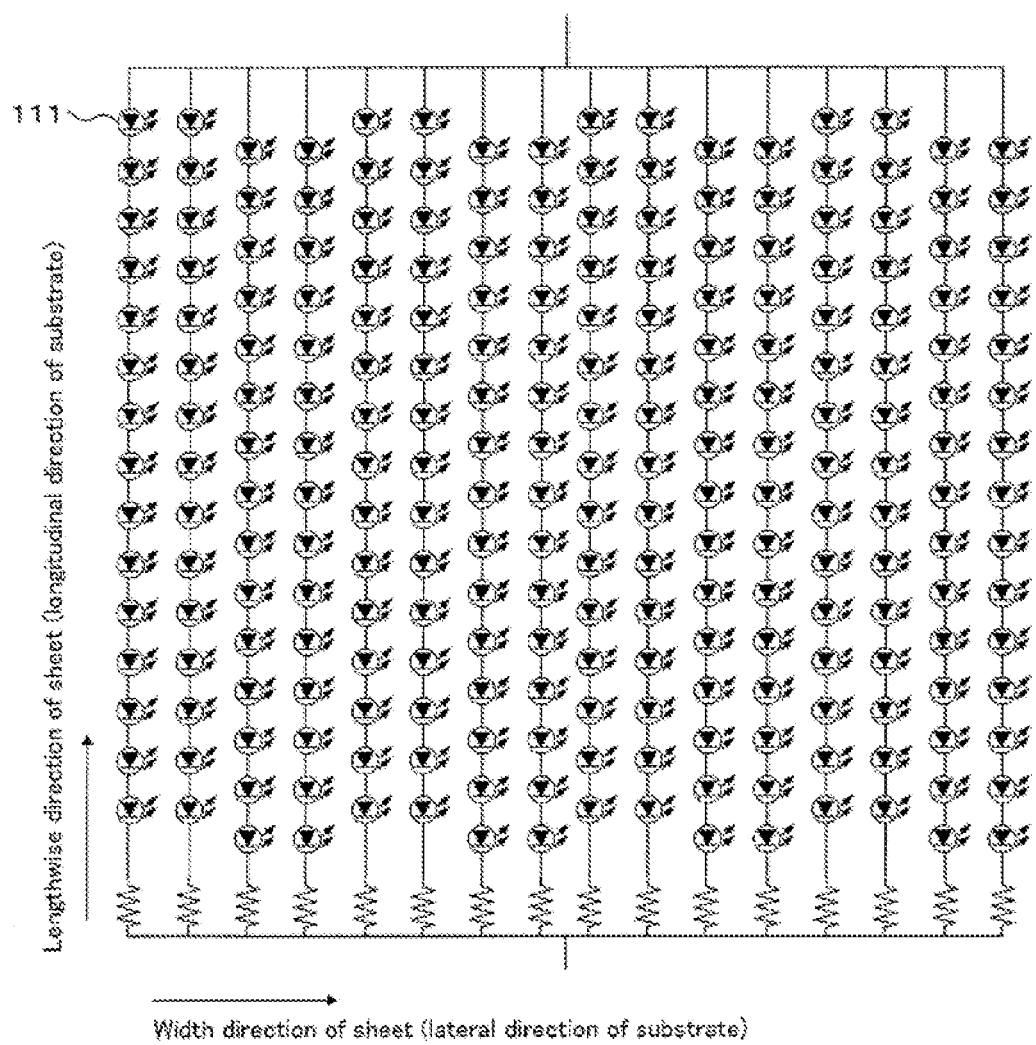
FIG. 10 is a wiring diagram of each substrate shown in FIG. 8.

FIG. 9 is a diagram showing an arrangement example of the LEDs 111 on each substrate 11. FIG. 9A shows a general view, and FIG. 9B shows a partially enlarged view. FIG. 10 is a wiring diagram of each substrate 11. The LED 111 of the present embodiment, which has a size of 0.6 mm square and can output 0.6 W at maximum, is secured on the substrate 11, which is insulated and made of aluminum, and is electrically wired. Since a total of 240 LEDs 111 are disposed on each substrate 11, the input power to each substrate 11 is 144 W (=0.6 W×240). As shown in FIG. 9 or 10, the number of LEDs 111 which are disposed straight in the longitudinal direction of the each substrate 11 is 15, and these 15 LEDs 111 are connected in series. Where, two LEDs 111 aligned in the lateral direction of the substrate 11 are paired, and such pairs of LEDs 111 are disposed at a pitch of 2 mm in the longitudinal direction of the substrate 11, and at a pitch of 2.2 mm in a staggered manner in the lateral direction. In other words, one bright part of the staggered pattern P to be projected onto the hot-rolled steel sheet S is made up of the lights emitted from two LEDs 111 aligned in the lateral direction of the substrate 11. By considering two LEDs 111 aligned in the lateral direction of the substrate 11 as a pair (the lights emitted from a pair of LEDs 111 aligned in the lateral direction are regarded as one bright part) as in the present embodiment, even when any of the LEDs 111 fails and the 15 LEDs connected in series become not to light up, it is possible to continue measurement as long as the adjacent 15 LEDs, which are connected in series and adjacently located in the lateral direction, can light up. However, the present invention will not be limited to such a configuration, and it is of course possible to configure such that individual LEDs 111 are disposed in a staggered manner at a predetermined pitch in the longitudinal and lateral directions of the substrate (for example, as described above, at a 2 mm pitch in the longitudinal direction of the substrate 11 and at a 2.2 mm pitch in the lateral direction) so that the light emitted from one LED 111 is regarded as one bright part of the staggered pattern P.

In the present embodiment, since the LED light source 1 needs to be installed in an actual worksite where dust particles and atomized water droplets scatter in large amount, the entire LED light source 1 is contained in a dust-proof box made of stainless steel. Moreover, to prevent dust particles and atomized water droplets from coming into the dust-proof box from an opening portion through which the staggered pattern P is projected, the configuration is made such that air is fed into the dust-proof box by using a large-scale blower and is issued from the aforementioned opening portion to the outside.

The light emitted from the LED light source 1 having a configuration described so far is projected unto the surface of the hot-rolled steel sheet S at an image-formation magnification of 18. The distance from the LED light source 1 to the surface of the hot-rolled steel sheet S is about 2.5 m, and the size of the projected staggered pattern P is 1200 mm in the longitudinal direction (lengthwise direction of sheet) and 1800 mm in the lateral direction (width direction of sheet). Since, as shown in FIG. 9, the disposition pitch of the LED 111 (disposition pitch of one pair of LEDs 111) in the LED light source 1 is 2 mm in the longitudinal direction of the substrate 11 and 2.2 mm in the lateral direction, and the image-formation magnification is 18 as described above, a staggered pattern P in which bright parts are disposed in a staggered manner at a pitch of about 40 mm respectively in the longitudinal and lateral directions (that is, the longitudinal set pitch $P_L$=40 mm, and the lateral set pitch $P_W$=40 mm) will be projected on the surface of the hot-rolled steel sheet S.

<A-3. Configuration of Image Pickup Device>

In the present embodiment, a two-dimensional CCD camera with an electronic shutter, which has a SVGA-size image sensor (the image sensor has 788 light receiving elements in the lateral direction and 580 light receiving elements in the longitudinal direction) and outputs 40 frames of image signals every second in a progressive scheme, is used as the image pickup device 2. This CCD camera is configured such that a plurality of cameras can pick up images in a synchronized manner through a synchronizing signal supplied from the outside. In the present embodiment, two of the above described CCD cameras 21 and 22 are used as the image pickup device 2. The CCD cameras 21 and 22 are placed side by side such that the field of view of each has a mutually overlapped portion, and the sensitivity is set at 1:4 by the adjustment of the lens aperture and the gain of each camera (hereafter, conveniently, the CCD camera with a lower sensitivity is referred to as a low-sensitivity image pickup device 21, and the CCD) camera with a higher sensitivity is referred to as a high-sensitivity image pickup device 22).

In the present embodiment, the exposure time of the image pickup device 2 is set at 4 msec such that the surface shape of the hot-rolled steel sheet S, which is wound up at a high speed of a maximum of 1500 mpm, can be measured without camera shake. Further, a bandpass filter that passes only bluish green color is provided in front of the lens of the image pickup device 2 of the present embodiment so that an image of the staggered pattern P can be clearly picked up without being affected by the radiant light emanating from the surf ee of the hot-rolled steel sheet S even when a hot-rolled steel sheet S having a temperature of 950° C. is measured. The image pickup device 2 of the present embodiment is also contained in a dust-proof box made of stainless steel as with the LED light source 1, and air purging by compressed air is performed such that lens is not soiled. Since the image pickup device 2 of the present embodiment has a field of view of about 1800 mm in the width direction of the hot-rolled steel sheet S, the resolution in the lateral direction of the pattern image acquired by the image pickup device 2 is about 2.3 mm/pixel.

<A-4. Configuration of Image Analysis Apparatus>

The image analysis apparatus 3 of the present embodiment is configured such that a program for executing the below described processing (hereafter, referred to as a "flatness analysis program") is installed in a general-purpose personal computer (CPU: Core 2 Duo processor of clock frequency 2.4 GHz, OS: Windows (registered trademark)). The image analysis apparatus 3 is configured such that image signals output from the low-sensitivity image pickup device 21 and the high-sensitivity image pickup device 22 are concurrently taken into a memory at 256 levels (8 bits) by a built-in multichannel image capturing board. The image data (pattern image) taken into the memory of the image analysis apparatus 3 is analyzed by the flatness analysis program, and a measured value of flatness as the analysis result is output to a monitor screen and a host control apparatus (a control apparatus for controlling the finish, rolling mill, etc.) of the image analysis apparatus 3.

<A5. Processing Contents of Flatness Analysis Program>

Figure 11:
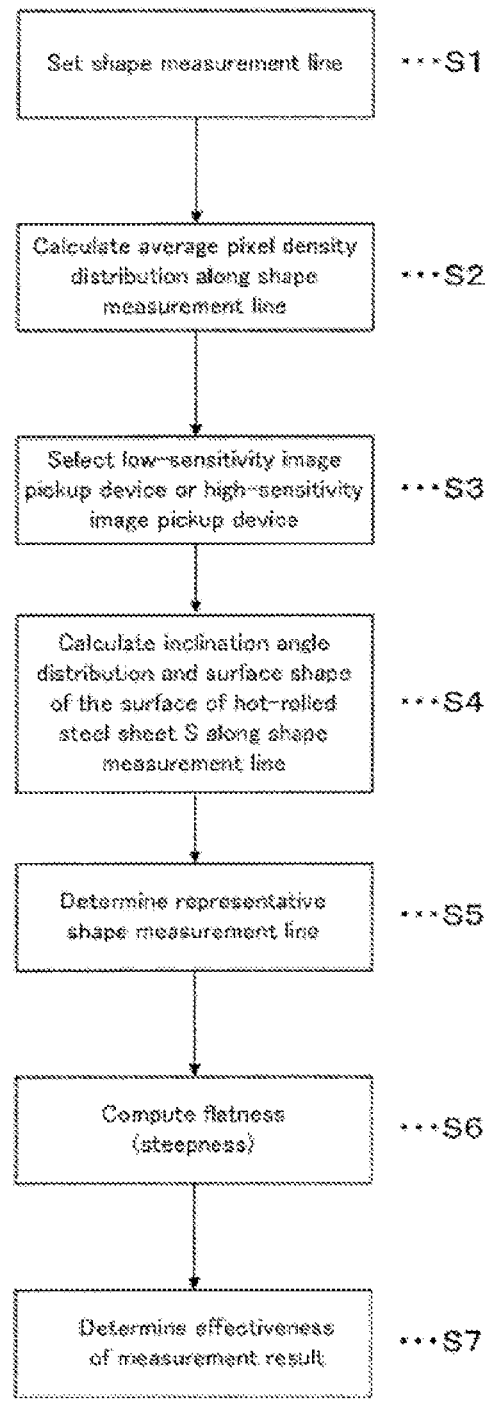
FIG. 11 is a flowchart showing the outline of processing executed at an image analysis apparatus shown in FIG. 5.

The image analysis apparatus 3 performs processing according to the procedure shown in FIG. 11 on the pattern image, which is picked up and acquired by the image pickup device 2, with the installed flatness analysis program. Hereafter, each processing will be successively described.

<A-5-1. Setting Process of Shape Measurement Line (S1 of FIG. 11)>

When setting a shape measurement line, first, it is judged whether or not the hot-rolled steel sheet S has entered in the field of view of the high-sensitivity image pickup device 22. To be specific, a predetermined region is provided in the central portion of the pattern image acquired by the high-sensitivity image pickup device 22, and when the pixel density in this region exceeds a preset threshold value, it is judged that the hot-rolled steel sheet S has entered into the field of view of the high-sensitivity image pickup device 22.

Figure 12A:
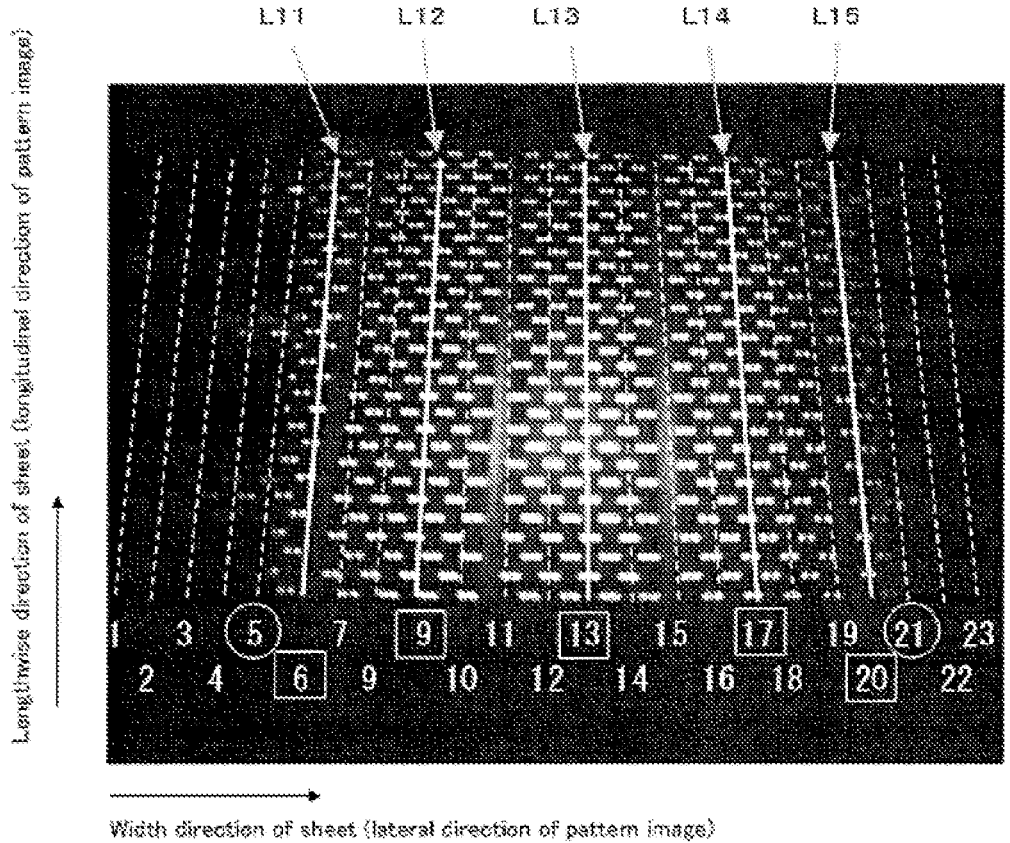
FIG. 12 (FIGS. 12A and 12B) is an explanatory diagram to illustrate a method for setting a shape measurement line for a hot-rolled steel sheet.

When it is judged that the hot-rolled steel sheet S has entered into the field of view of the high-sensitivity image pickup device 22; 23 shape measurement lines (straight lines which are given Nos. 1 to 23 in FIG. 12A) which each extend along the lengthwise direction of sheet (the longitudinal direction of the pattern image) at 75 mm pitch in the width direction of sheet (the lateral direction of the pattern image) are set over a range of 1650 mm which is a maximum manufacturing width of the hot-rolled steel sheet S, taking into consideration of the resolution in the lateral direction of the pattern image (about 2.3 mm/pixel in the present embodiment) in the pattern image acquired by the high-sensitivity image pickup device 22.

It is noted that by determining in advance the positional relationship between the coordinate in the pattern image acquired by the high-sensitivity image pickup device 22 and the corresponding coordinate in the pattern image acquired by the low-sensitivity image pickup device 21, it is possible, for the pattern image acquired by the low-sensitivity image pickup device 21, to set shape measurement lines at positions corresponding to the shape measurement lines set for the pattern image acquired by the high-sensitivity image pickup device 22 as described above.

<A.-5-2. Calculation Processing of Average Pixel Density Distribution Along Shape Measurement Line (S2 of FIG. 11)>

In this processing, as for the pattern images acquired respectively by both of the low-sensitivity image pickup device 21 and the high-sensitivity image pickup device 22, pixel densities on a straight line which passes pixels on the shape measurement line extending in the lateral direction of the staggered pattern, and which has a length not less than twice the lateral set pitch of bright part (the lateral set pitch $P_W$=40 mm in the present embodiment) are averaged to calculate an average pixel density. As described above, since in the present embodiment, resolution in the lateral direction of the pattern image is about 2.3 mm/pixel, the length of the straight line on which pixel densities are averaged may be not less than 35 pixels. In the present embodiment, also taking into consideration of that the lateral spacing of bright part of the staggered pattern becomes larger in the pixel region corresponding to the seam of each substrate 11, it is configured such that the length of the straight line on which pixel densities are averaged is 60 pixels, and average pixel density distribution along each shape measurement line is calculated. Further, an average pixel density distribution is calculated for a range in which x coordinate of each shape measurement line (position along the longitudinal direction of the staggered pattern in the pattern image) is 60 to 429 in pixel unit (that is, 370 average pixel data).

<A.-5-3. Selection Processing of Low-Sensitivity Image Pickup Device or High-Sensitivity Image Pickup Device (S3 of FIG. 11)>

In this processing, the number of pixels in which density is saturated is counted in the average pixel density distribution along each shape measurement line set in the pattern image acquired by the high-sensitivity image pickup device 22. To be specific, in the present embodiment, if the density exceeds 250, it is regarded that the density is saturated, and the number of such pixels (the number of saturated density pixels) is counted. As a result, when the number of saturated density pixels is not less than a predetermined threshold value which is preset, the average pixel density distribution along the shape measurement line set in the pattern image acquired by the low sensitivity image pickup device 21 is used (as described below, this average pixel density distribution is used to calculate the surface shape of the hot-rolled steel sheet S along the shape measurement line). On the other hand, when the number of saturated density pixels is less than a preset threshold value, the average pixel density distribution along the shape measurement line set in the pattern image acquired by the high-sensitivity image pickup device 22 is used. To be specific, for example, when the number of saturated density pixels is not less than a threshold value in the average pixel density distribution along the shape measurement line of No. 6 set in the pattern image acquired by the high-sensitivity image pickup device 22, the average pixel density distribution along the shape measurement line of No. 6 set in the pattern image acquired by the low-sensitivity image pickup device 21 is used. Further, for example, when the number of saturated density pixels is less than a threshold value in the average pixel density distribution along the shape measurement line of No. 13 set in the pattern image acquired by the high-sensitivity image pickup device 22, the average pixel density distribution along the shape measurement line of No. 13 set in the pattern image acquired by the high-sensitivity image pickup device 21 is used.

<A.-5-4. Calculation Processing of Inclination Angle Distribution and Surface Shape of the Surface of Hot-Rolled Steel Sheet Along Shape Measurement Line (S4 of FIG. 11)>

In the present processing, the distribution of longitudinal pitch $p_m(x)$ of bright part of the staggered pattern along the shape measurement line is calculated based on the average pixel density distribution along the shape measurement line which is calculated as described above for the hot-rolled steel sheet S which is the target of measuring flatness.

On the other hand, as for a reference material which is placed horizontally and has a flat surface shape, each processing similar to those described above is applied, and the average pixel density distribution along the shape measurement line in the pattern image acquired for the reference material is calculated. Then, based on the average pixel density distribution along such shape measurement line, the distribution of longitudinal pitch $p_s(x)$ of bright part of the staggered pattern along the shape measurement line is calculated in advance.

Although various methods are conceivable as the method for calculating the distributions of longitudinal pitch $p_m(x)$ and $p_s(x)$ of bright part based on the average pixel density distribution, in the present embodiment, a phase analysis method described below is applied.

Hereafter, a phase analysis method to be applied to the above described average pixel density distribution will be described.

Now, let the average pixel density distribution obtained for the hot-rolled steel sheet S, which is the target of measuring flatness, be f(x). Extracting only the spatial frequency components corresponding to an expected fluctuating range (for example, −5% to +5%) of the longitudinal pitch of bright part of the staggered pattern from f(x) by applying a frequency analysis method such as Fourier transform method to f(x) will result in a distribution $f_S(x)$ represented by the following Formula (9). Since only the distribution of longitudinal pitches of bright part of the projected staggered pattern is contained in this $f_S(x)$ as a periodic component, it is possible to determine the distribution of longitudinal pitch by analyzing a phase component $\phi(x)$.

$$f_S(x) = A(x)\sin \phi(x) \quad (9)$$

For the analysis of phase component, for example, a Hilbert transform can be used. The Hilbert transform refers to a transformation to a waveform which has the same amplitude and whose phase is shifted by $\pi/2$ (90°) with respect to the original waveform. The calculation method for performing the Hilbert transform takes advantage of the fact that replacing, with zero, the coefficient of negative frequency part of $F_S(k)$ obtained by performing a discrete Fourier transform of $f_S(x)$ and performing reverse discrete Fourier transform thereof results in $f_S(x)+if_H(x)$. Since the resultant $f_H(x)$ is shifted in phase by $\pi/2$ with respect to $f_S(x)$, it can be represented by the following Formula (10).

$$f_H(x) = A(x)\sin\left\{\phi(x) - \frac{\pi}{2}\right\} = -A(x)\cos\phi(x) \quad (10)$$

Therefore, the result of calculating the arctangent (inverse tangent function) of $f_S(x)/f_H(x)$ will be equal to $-\phi(x)$ which is a phase component, as shown in the following Formula (11).

$$\tan^{-1}\left\{\frac{f_S(x)}{f_H(x)}\right\} = -\tan^{-1}\left\{\frac{A(x)\sin\phi(x)}{A(x)\cos\phi(x)}\right\} = -\phi(x) \quad (11)$$

Since the obtained $\phi(x)$ is wrapped (folded back at every $\pi$), addition and subtraction of $\pi$ (unwrapping processing) is performed at every folding back point to obtain a continuous waveform. Moreover, as shown in the following Formula (12), by calculating the root sum square of $f_S(x)$ and $f_H(x)$, it is possible to determine the amplitude $A(x)$ of $f_S(x)$.

$$\sqrt{\{f_s(x)\}^2+\{f_H(x)\}^2} = \sqrt{\{A(x)\sin(\phi(x))\}^2+\{A(x)\cos(\phi(x))\}^2} = A(x) \quad (12)$$

Here, since $d\phi(x)/dx$, which is differential of phase component $\phi(x)$, equals to a spatial frequency distribution multiplied by $2\pi$, the longitudinal pitch $p_m(x)$ of the bright part of the staggered pattern can be determined by the following Formula (13).

$$p_m(x) = 2\pi\left(\frac{d\phi(x)}{dx}\right)^{-1} \quad (13)$$

By performing the same analysis as described above on the average pixel density distribution obtained for a reference material which is placed horizontally and has a flat surface shape, it is possible to determine the longitudinal pitch $p_s(x)$ of the bright part of the staggered pattern.

Next, in the present processing, the distribution of inclination angle $\theta(x)$ of the surface of the hot-rolled steel sheet S along the shape measurement line is calculated based on the distributions of longitudinal pitches $p_m(x)$ and $p_s(x)$ of the bright part of the staggered pattern which are calculated as described above, and the following Formula (1).

$$\theta(x) = \tan^{-1}\left\{\frac{(p_m(x)/p_s(x)) - 1}{\tan\alpha + (p_m(x)/p_s(x))\tan\beta}\right\} \quad (1)$$

In the above described Formula (1), x stands for the position along the longitudinal direction of the staggered pattern in the pattern image (the position along the lengthwise direction of sheet material); $\theta(x)$ stands for the distribution of the inclination angle formed by the horizontal direction and the surface of sheet material; $\alpha$ stands for the angle formed by the vertical direction and the image pickup direction by the image pickup device (25° in the present embodiment); and $\beta$ stands for the angle formed by the vertical direction and the projection direction of the staggered pattern (15° in the present embodiment).

Finally, in the present processing, the surface shape of the hot-rolled steel sheet S along each shape measurement line is calculated by integrating the inclination angle of the surface of the hot-rolled steel sheet S along each shape measurement line, wherein the inclination angle is calculated as described above, along each shape measurement line.

Whether or not the surface shape of the hot-rolled steel sheet S along each shape measurement line has been normally calculated may be determined by, for example, whether or not the amplitude of the average pixel density distribution along each shape measurement line has become excessively small. To be specific, among the amplitude $A(x)$ which is calculated by Formula (12) by performing phase analysis of the average pixel density distribution $f(x)$ as described above, the number of pixels, amplitude of which is less than a preset threshold value, is counted so that it is possible to determine that if the number of pixels is less than a predetermined number, the surface shape of the hot-rolled steel sheet S has not been normally calculated, and that if the number of pixels is not less than the predetermined number, the surface shape of the hot-rolled steel sheet S has been normally calculated.

<A-5-5. Determination of Representative Shape Measurement Line (S5 of FIG. 11)>

Figure 12B:
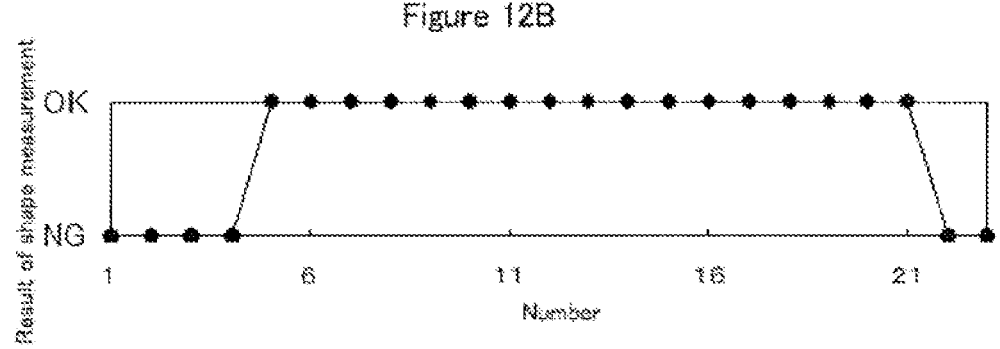

In the present processing, first, among all the shape measurement lines, the shape measurement lines for which the surface shape of the hot-rolled steel sheet S has been normally calculated are identified by the above described determination. In the example shown in FIG. 12, the surface shape of the hot-rolled steel sheet S has been normally calculated on the shape measurement lines of Nos. 5 to 21 (see FIG. 12B).

Next, among the shape measurement lines for which the surface shape of the hot-rolled steel sheet S has been normally calculated (the shape measurement lines of Nos. 5 to 21), the shape measurement lines (the shape measurement lines of Nos. 6 and 20) which are located immediately inward in the widthwise direction from the shape measurement lines located closest to the widthwise edges of the sheet (the shape measurement lines of Nos. 5 and 21) are selected as the representative shape measurement lines L11 and L15.

Further, among the shape measurement lines (the shape measurement lines of Nos. 5 to 21) for which the surface shape of the hot-rolled steel sheet S has been normally calculated, the shape measurement lines (the shape measurement lines of Nos. 9, 13 and 17) which divide the range in the width direction of sheet defined by the shape measurement lines (the shape measurement lines of Nos. 5 and 21) located closest to a widthwise edge of the sheet, into four approximately equal parts are selected as the representative shape measuring lines L12, L13 and L14.

As so far described, a total of 5 representative shape measurement lines L11 to L15 are determined.

<A-5-6. Computation Processing of Flatness (Steepness) (S6 of FIG. 10)>

In the present processing, a steepness is computed based on the surface shape of the hot-rolled steel sheet S along each of the representative shape measurement lines L1 to L15 which is calculated as described above. Upon computing such steepness, first, an elongation rate at each of the representative shape measurement lines L11 to L15 is calculated based on the surface length in fixed sections of interest along each of the representative shape measurement lines L11 to L15, and the direct distance between both ends of the sections. Then, a differential elongation rate $\Delta\epsilon$ which is the difference between the elongation rate $\epsilon_{CENT}$ at the representative shape measurement line L13 in the widthwise central portion of the hot-rolled steel sheet S and the elongation rate $\epsilon_{EDGE}$ at other representative shape measurement lines L11, L12, L14 and L15 (see the above described Formula (2)). Further, a steepness $\lambda$ is calculated based on the differential elongation rate $\Delta\epsilon$ and Formula (3) described above.

Hereafter, specific description will be made on the case where a steepness is determined based on the surface shape along the representative shape measurement line L11 in the vicinity the vicinity of the left side edge and the representative shape measurement line L13 in the widthwise central portion with reference to FIG. 13.

Figure 13:
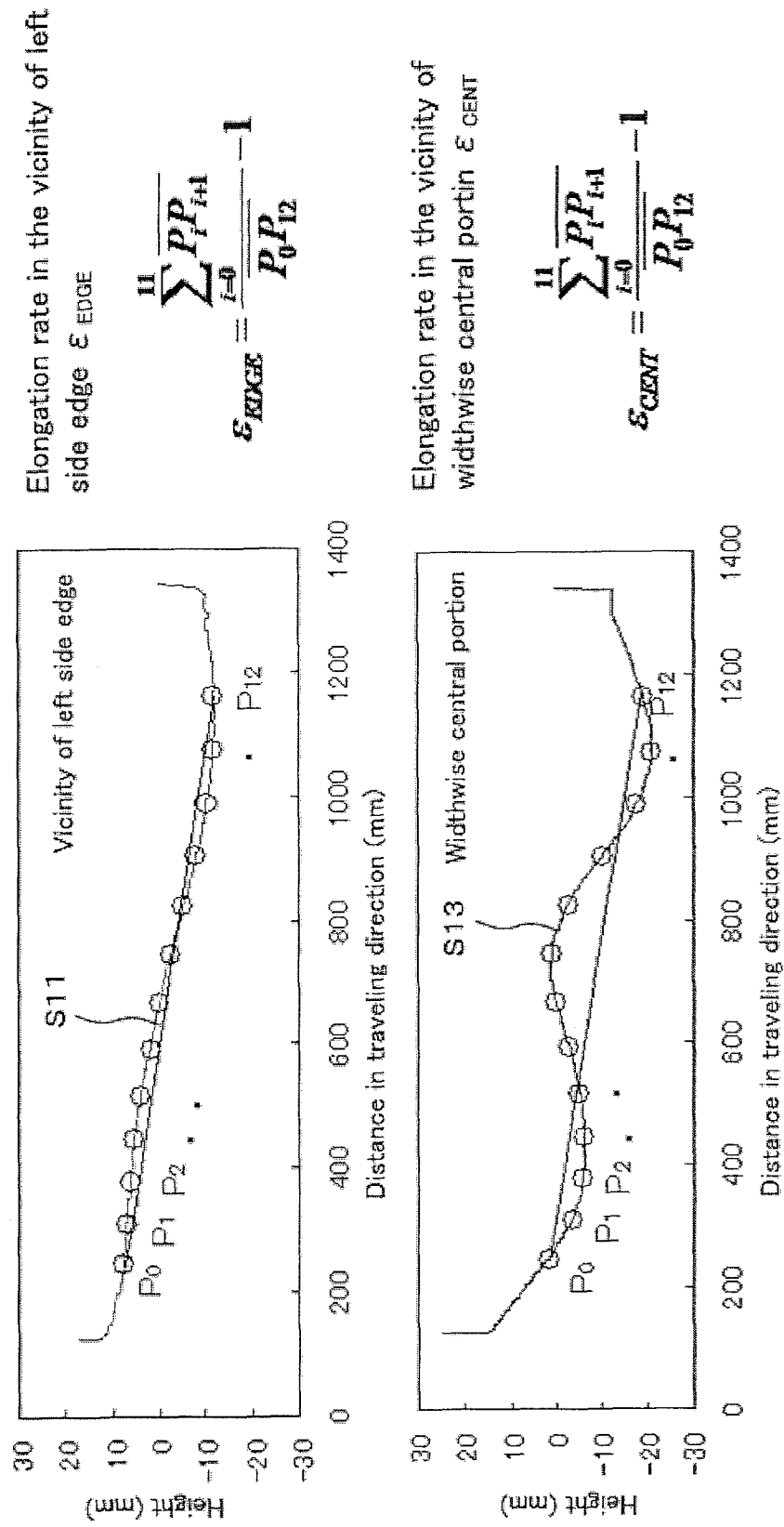
FIG. 13 is an explanatory diagram to illustrate a method for computing a steepness.

FIG. 13 is an explanatory diagram to illustrate a method for computing a steepness. The elongation rate $\epsilon_{EDGE}$ at the representative shape measurement line L11 is calculated by a mathematical formula in the figure based on the surface length in sections of interest of the surface shape S11 of the hot-rolled steel sheet S along the representative shape measurement line L11, and the direct distance between both ends of the sections. Similarly, the elongation rate $\epsilon_{CENT}$ at the representative shape measurement line L13 is calculated by a mathematical formula in the figure based on the surface length in sections of interest of the surface shape S13 of the hot-rolled steel sheet S along the representative shape measurement line L13, and the direct distance between both ends of the sections. In the example shown in FIG. 13, in order to suppress the effects of minute measurement noises, surface lengths of the surface shapes S11 and S13 are calculated by dividing the section of interest with points $P_0$ to $P_{12}$ into 12 subsections, and approximating the section in a piecewise linear manner. Then, the differential elongation rate $\Delta\epsilon$ which is the difference between the elongation rate $\epsilon_{CENT}$ at the representative shape measurement line L13 and the elongation rate $\epsilon_{EDGE}$ at the representative shape measurement line L11 is calculated, and a steepness $\lambda$ is calculated based on the differential elongation rate $\Delta\epsilon$ and Formula (3).

<A-5-7. Determination Processing of Effectiveness of Measurement Result (S7 of FIG. 11)>

In the present processing, as described above, the flatness (steepness) on a plurality of different areas of the hot-rolled steel sheet S in the lengthwise direction are successively measured, and it is determined whether or not measurement is successful for latest N times of measured values of flatness where N is preset (and N is an integer not less than 2), respectively. In the present embodiment, determination on whether or not measurement is successful is determined by whether or not the surface shape of the hot-rolled steel sheet S has been normally calculated along all the representative shape measurement lines. That is, only after the surface shape of the hot-rolled steel sheet S along all the representative shape measurement lines has been normally calculated, it is determined that measurement is successful for the flatness measured value. Whether or not the surface shape of the hot-rolled steel sheet S along a representative shape measurement line has been normally calculated is determined such that, as described above, the number of pixels, amplitude of which is less than a preset threshold value, is counted among the amplitudes A(x) calculated by Formula (12), and when the number of such pixels is less than a predetermined number, it is determined that the surface shape of the hot-rolled steel sheet S has not been normally calculated, and when the number of pixels is not less than the predetermined number, it is determined that the surface shape of the hot-rolled steel sheet S has been normally calculated.

Next, in the present processing, when the number of times it is determined that measurement is successful is not less than a preset threshold value M among the measured values of flatness of latest N times, a signal showing that measurement is successful (a signal showing that measurement result is effective) is output to a control apparatus that controls a finish rolling mill etc., and an average value of measured values of flatness which are measured successfully among the measured values of flatness of the latest N times is output to the aforementioned control apparatus as the measurement result of flatness. On the other hand, when the number of times it is determined that measurement is successful is less than the aforementioned threshold value M, a signal showing that measurement is failure (a signal showing that measurement result is ineffective) is output to the aforementioned control apparatus.

In the present embodiment, N is set as N=10. According to the image analysis apparatus 3 of the present embodiment, 20 frames of pattern images can be processed per one second, and therefore N=10 corresponds to 0.5 seconds. This is a sufficient response speed of measurement to use the measured value of flatness for the feedback control to the finish rolling mill, and the like. Further, in the present embodiment, the threshold value M is set as M=5. In order to compute an accurate steepness, it is considered that measure values over a length of 5 m, which is not less than around 3 times of the width of the hot-rolled steel sheet S (1.65 m at maximum), are necessary. For this reason, the threshold value M is set as M=5 such that a measured result for which measurement has been able to be normally performed at least 5 times over a range of a field of view of 1 m in the lengthwise direction of the hot-rolled steel sheet S is output to the aforementioned control apparatus.

Hereafter, effects when applying the method for measuring a flatness relating to the present embodiment will be described.

<A-6. Effect of Synchronous Lighting of LED>

Figure 14:
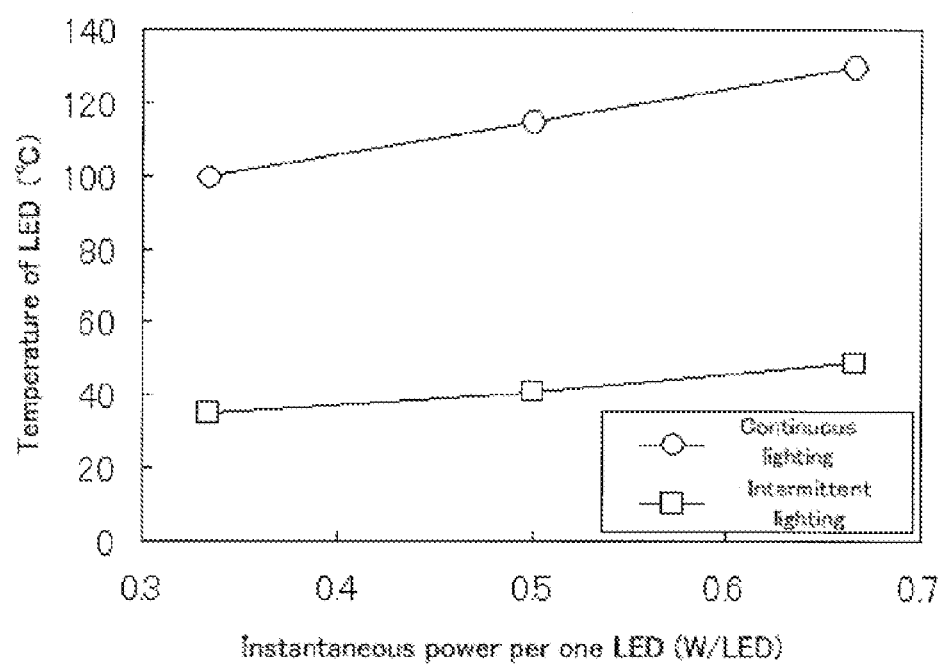
FIG. 14 is a graph showing the result of evaluating the temperature rise of an LED for each of the case where the LED of the LED light source shown in FIG. 5 is continuously lit, and the case where it is intermittently lit in synchronous with the image pickup device.

FIG. 14 is a graph showing the result of evaluating the temperature rise (end-point temperature) of an LED for each of the case where the LED of the present embodiment is continuously lit, and the case where it is intermittently lit in synchronous with the image pickup device (frequency is 40 Hz and lighting time is 5 msec).

As shown in FIG. 14, in the case of continuous lighting, the LED 111 will reach a temperature of as high as 100° C. or more even when the input power is as low as about 0.3 W. Since the heat resistance temperature of an LED is generally about 120° C., in the case of continuous lighting, the life of the LED 111 may significantly decrease. On the other hand, when intermittent lighting is adopted as in the present embodiment, the temperature rise is as low as about 50° C. even when a maximum, power of 0.6 W (instantaneous value) is input, and thus failure of the LED 111 due to heat build-up is prevented.

<A-7. Verification of Measurement Accuracy of Inclination Angle>

FIG. 15 shows the result of verifying the measurement accuracy of inclination angle by the flatness measurement apparatus of the present embodiment by using a sample for inclination angle measurement. FIG. 15A is a plan view showing an outline configuration of a sample for inclination angle measurement; FIG. 15B is a front view showing an outline configuration of the sample for inclination angle measurement; and FIG. 15C is a graph showing a verification result of measurement accuracy.

As shown in FIGS. 15A and 15B, the sample for inclination angle measurement is configured such that inclination angles at two portions (portions corresponding to the positions of rotational axes a and b) in the lengthwise direction of a vinyl chloride sheet as the sheet material can be arbitrarily set, and the inclination angle set at each portion is measured with an inclinometer (measurement accuracy is 0.05°). Next, the sample for inclination angle measurement is placed on a table roller, and the inclination angles of the vinyl chloride sheet at the aforementioned two portions are measured using the flatness measurement apparatus 100 shown in FIG. 5. The abscissa of FIG. 15C shows the difference between the inclination angles set at two portions, and the ordinate shows the difference between inclination angles at a widthwise central portion of the vinyl chloride shoot at the aforementioned two portions measured by the flatness measurement apparatus 100.

As shown in FIG. 15C, the difference between the measurement results of the flatness measurement apparatus 100 and the set values (measured values of the inclinometer) has resulted in $2\pi=0.45°$. When it is assumed that the surface shape of the sheet material is sinusoidal, the steepness and the inclination angle are in proportional relationship, and a maximum steepness of 5%, which is conceivable in a manufacturing line for hot-rolled steel sheet, corresponds to 9° when converted into an inclination angle. In this regard, the aforementioned 0.45° corresponds to 0.13% when converted into the steepness; thus it can be said that a good measurement accuracy is secured.

<A-8. Comparison of Pattern Images>

Figure 16A:
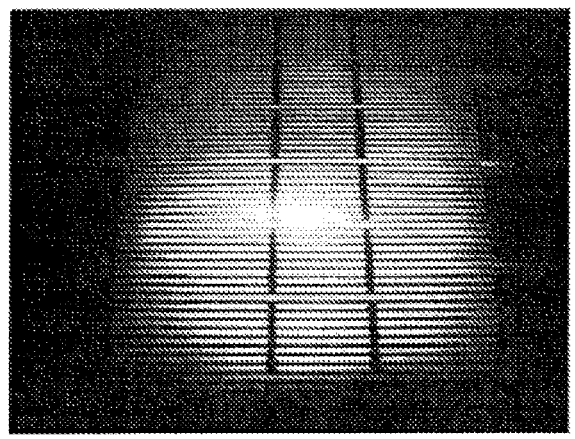
FIG. 16 (FIGS. 16A, 16B and 16C) shows an exemplary pattern image which is obtained when a linear pattern by a conventional projector including a slide is used, and an exemplary pattern image which is obtained when a staggered pattern by the LED light source shown in FIG. 5 is used, as the bright and dark pattern to be projected onto the surface of the hot-rolled steel sheet.
Figure 16B:
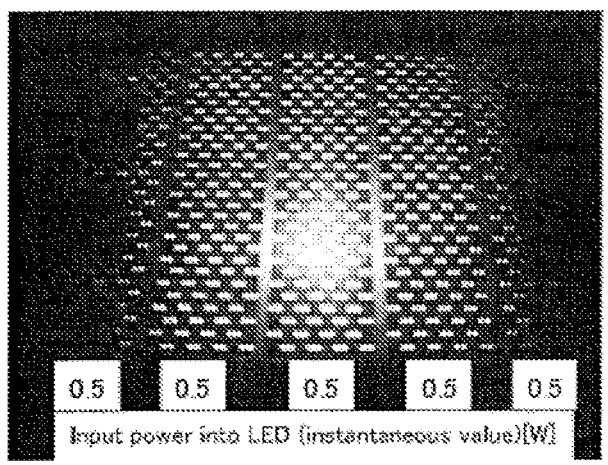
Figure 16C:
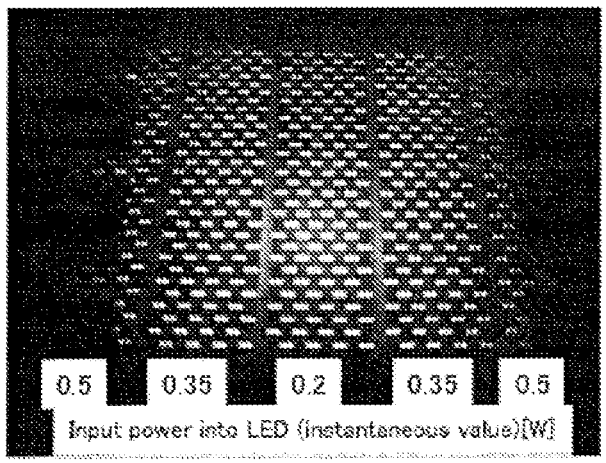

FIG. 16 shows an exemplary pattern image which is obtained when a linear pattern by a conventional projector including a slide is used, and an exemplary pattern image which is obtained when a staggered pattern by the LED light source of the present embodiment is used, as the bright and dark pattern to be projected onto the surface of the hot-rolled steel sheet S. FIG. 16A shows an exemplary pattern image when a liner pattern by a conventional projector including a slide is used. FIG. 16B is an exemplary pattern image when a staggered pattern by the LED light source of the present embodiment is used, showing an exemplary case where the same power is input into all the substrates of the LED light source. FIG. 16B is an exemplary pattern image when a staggered pattern by the LED light source of the present embodiment is used, showing an exemplary case where the input power to substrates corresponding to the widthwise central portion of the hot-rolled steel sheet S is set lower than that to substrates corresponding to the widthwise edge portion thereof. Any of the pattern images of FIGS. 16A to 16C is a pattern image acquired by the high-sensitivity image pickup device 22. Moreover, any of the pattern images of FIGS. 16A to 16C is a pattern image acquired for a constant region of the hot-rolled steel sheets S of the same material and dimensions.

It is noted that as the light source for making up the above described conventional projector including a slide, a metal halide lamp having a rated power of 2.5 kW is used. The light emitted from this lamp passes through a slide and an image forming lens which are disposed in the front side of the lamp, and is projected onto the surface of the hot-rolled steel sheet S at an image-formation magnification of about 18 times. The distance from the projector to the surface of the hot-rolled steel sheet S is 2.5 m, and the dimensions of the projected linear pattern are 1400 mm longitudinally and 1800 mm laterally. The aforementioned slide is formed with a linear pattern by vapor deposition of Cr onto a silica glass substrate. The portions with Cr deposition make up dark parts of the liner pattern, and portions without deposition make up bright parts of the liner pattern.

Figure 17B:
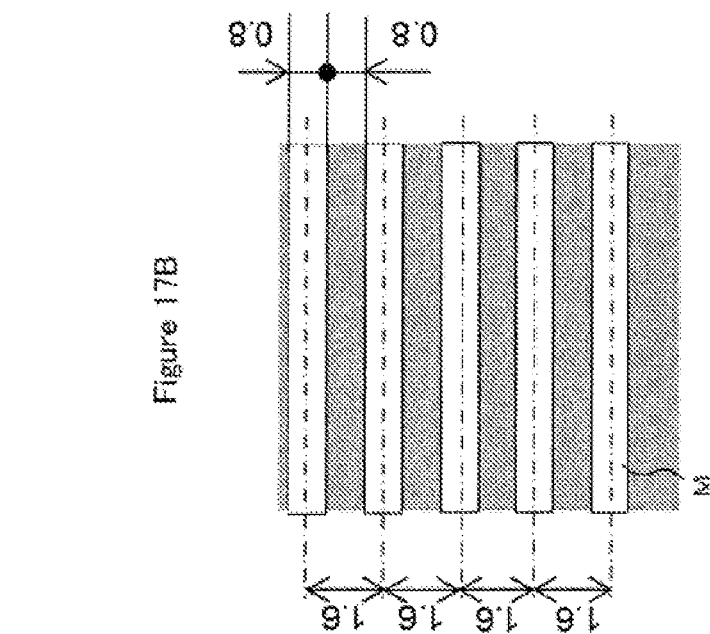
FIG. 17 (FIGS. 17A and 17B) is a diagram showing an example of linear pattern formed in a slide making up a conventional projector.
Figure 17A:
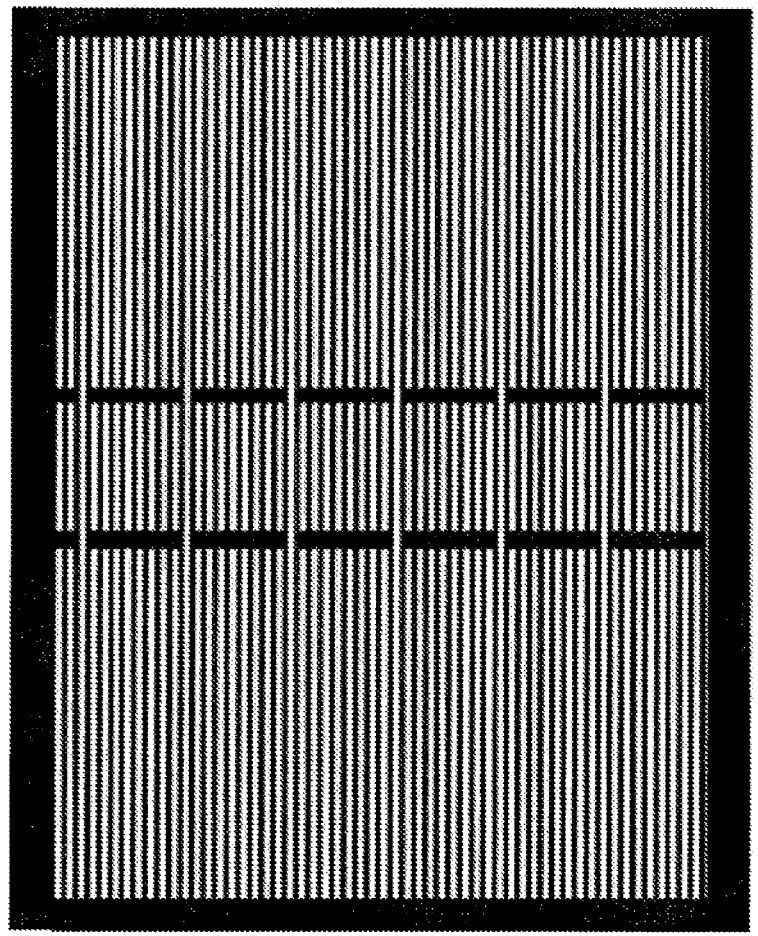

FIG. 17 is a diagram showing an example of linear pattern formed in a slide making up a conventional projector. FIG. 17A shows a general view and FIG. 17B shows a partially enlarged view. As shown in FIG. 17, bright parts M are disposed at a pitch of 1.6 mm in the longitudinal direction in the slide. Since, as described before, the image-formation magnification is about 18, a linear pattern in which bright parts M are disposed at a pitch of about 28.8 mm will be projected to the surface of the hot-rolled steel sheet S. The illuminance near the surface of the hot-rolled steel sheet S will be about 6000 Lx near the optical axis of the projector, and about 3000 Lx in the vicinity of the edge of the hot-rolled steel sheet M.

As shown in FIG. 16A, when a linear pattern by a conventional projector is used, the pixel density is saturated in a pixel region (central portion of the pattern image) corresponding to a location where specularly reflected light is received, and the linear pattern is indistinct. In contrast to this, when a staggered pattern by the LED light source of the present embodiment is used, even when the same power is input to all the substrates (FIG. 16B), the staggered pattern is not fully indistinct in the central portion of the pattern image, and particularly when the input power to the substrate corresponding to the central portion of the pattern image is set to be minimum (FIG. 16C), the staggered pattern is not indistinct and can be clearly observed.

<A-9. Comparison of Measurement Chart of Steepness Etc.>

Figure 18A:
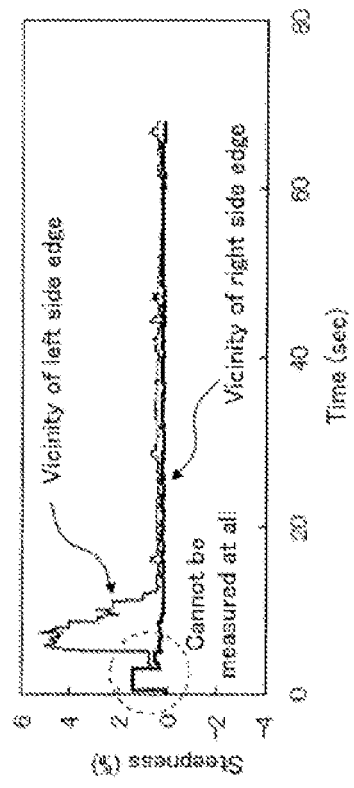
FIG. 18 (FIGS. 18A, 18B and 18C) shows measurement examples of steepness and others for the total length of a coil of steel sheet when the linear pattern by the conventional projector including a slide is used as the bright and dark pattern to be projected onto the surface of the hot-rolled steel sheet.
Figure 18C:
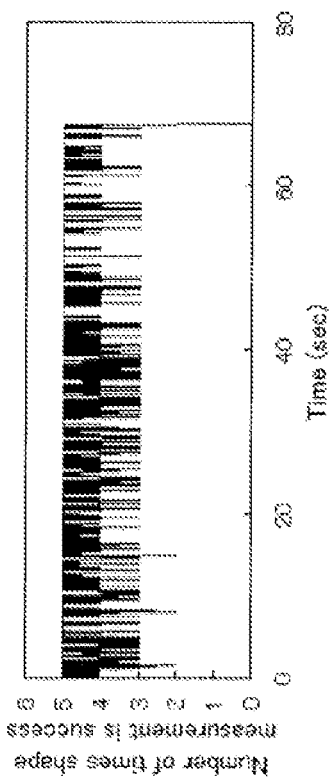
Figure 18B:
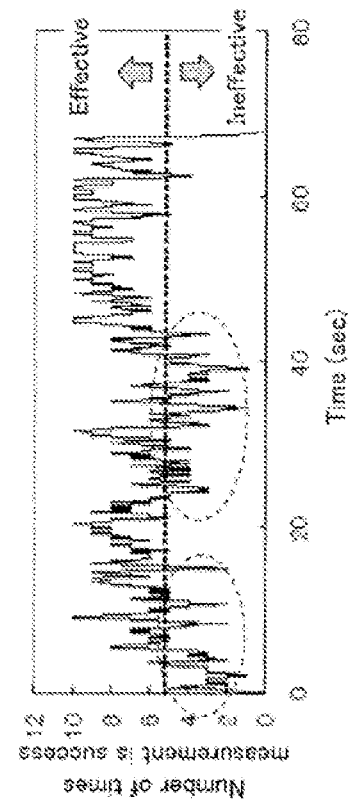
Figure 19C:
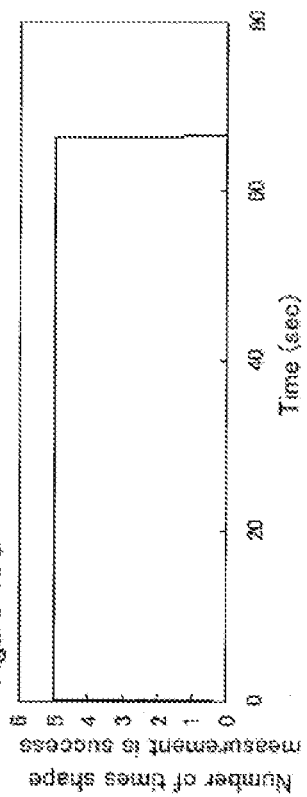
FIG. 19 (FIGS. 19A, 19B and 19C) shows measurement examples of steepness and others for the total length of a coil of steel sheet when the staggered pattern by the LED light source shown in FIG. 5 is used as the bright and dark pattern to be projected onto the surface of the hot-rolled steel sheet.
Figure 19A:
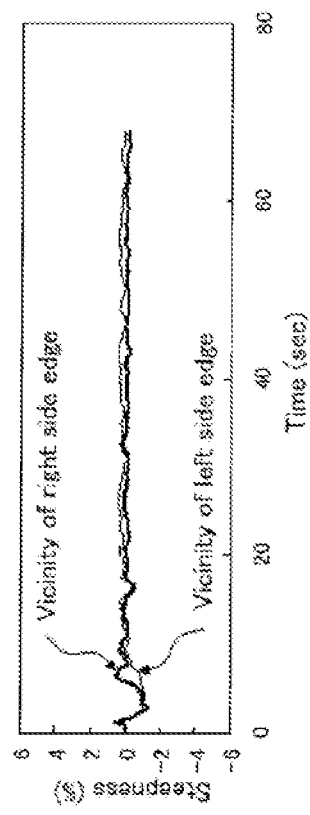
Figure 19B:
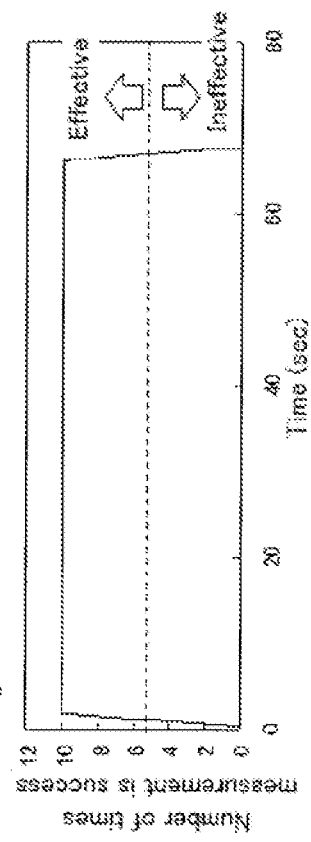

FIG. 18 shows measurement examples of steepness and others for the total length of a coil of steel sheet when the linear pattern by the above described conventional projector including a slide is used as the bright and dark pattern to be projected onto the surface of the hot-rolled steel sheet S. FIG. 19 shows measurement examples of steepness and others for the total length of a coil of steel sheet when the staggered pattern by the LED light source of the present embodiment is used as the bright and dark pattern to be projected onto the surface of the hot-rolled steel sheet S. FIGS. 18A and 19A show measured values of steepness measured for the representative shape measurement lines L11 and L15 in the vicinity of both edges; FIGS. 18B and 19B show the number of times the measurement has been success among latest 10 measure values of flatness; and FIGS. 18C and 19C show the number of the representative shape measurement lines for which surface shape has been normally measured. The hot-rolled steel sheet S which is the target of measurement is of the same material and dimensions for all the cases, and is of the portion near the front end where flatness defects have occurred.

As shown in FIG. 18, when a linear pattern by the conventional projector including a slide is used as the bright and dark pattern, regarding the measurement of surface shape, there has been cases in which measurement cannot be normally performed for all five representative shape measurement lines, and measurement fails for some of the representative shape measurement lines. As the result, there is a case in which the number of times of successful measurement is less than 5 times among the latest 10 measured values of flatness, resulting in unreliable measure values, which cannot be output to the control apparatus. Particularly, measurement has been failed in a no-tension state of the front end of the hot-rolled steel sheet S, which actually requires the flatness to be controlled. On the other hand, as shown in FIG. 19, when the staggered pattern by the LED light source of the present embodiment is used as the bright and dark pattern, measurement, of surface shape is normally performed for substantially the total length of a coil of the hot-rolled steel sheet S, thus showing that improvement is achieved compared with the conventional art.

<A-10. Verification of Edge Detection Position>

Figure 20:
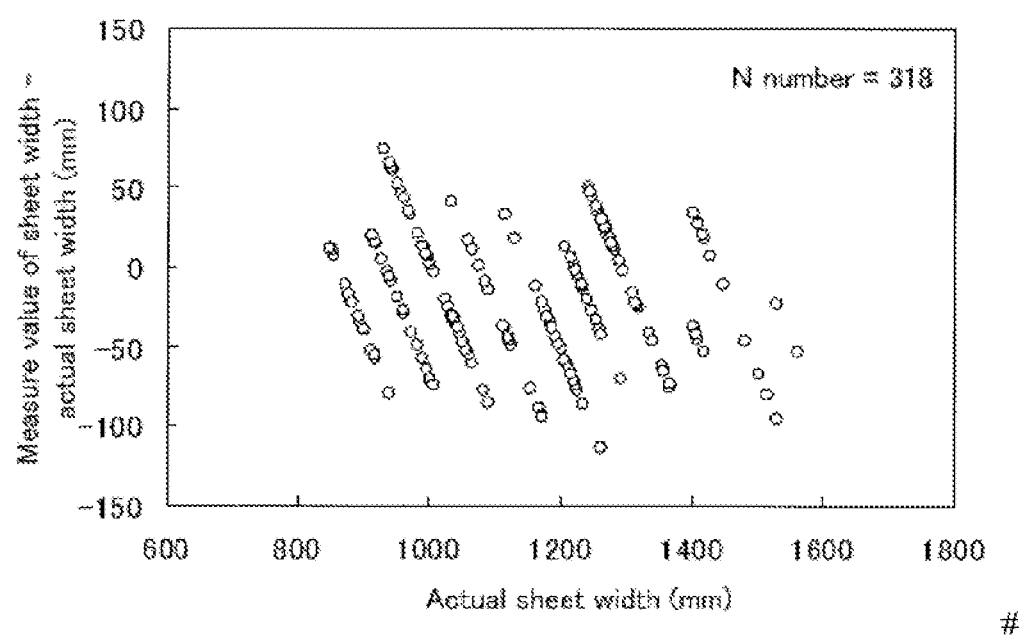
FIG. 20 is a graph showing the result of the evaluation of measured values of the sheet width of the hot-rolled steel sheet which can be calculated by the flatness measurement apparatus shown in FIG. 5.

FIG. 20 is a graph showing the result of the evaluation of measured values of the sheet width of the hot-rolled steel sheet S which can be calculated by the flatness measurement apparatus 100 of the present embodiment. The abscissa of FIG. 20 shows actual width of sheet, and the ordinate shows the difference between the measured value of width of sheet by the flatness measurement apparatus 100 and the actual width of sheet. The measured value of width of sheet by the flatness measurement apparatus 100 refers to, as shown and described with reference to FIG. 12, the spacing between the shape measurement lines which are closest to widthwise edges (shape measurement lines of Nos. 5 and 21 in the example shown in FIG. 12) among shape measurement lines (the shape measurement lines of Nos. 5 to 21) for which the surface shape of the hot-rolled steel sheet S is normally calculated. Therefore, the measured value of the width of sheet by the flatness measurement apparatus 100 will be calculated at a pitch of 75 mm as with the pitch of each shape measurement line.

As shown in FIG. 20, the difference between the measured value of the width of sheet by the flatness measurement apparatus 100 and an actual width of sheet will be −100 mm to +50 mm. As described before, the measured value of the width of sheet by the flatness measurement apparatus 100 refers to the spacing between the shape measurement lines which are closest to the widthwise edges among the shape measurement lines for which the surface shape of the hot-rolled steel sheet S is normally calculated. Moreover, the representative shape measurement line L11 in the vicinity of the left side edge and the representative shape measurement line L15 in the vicinity of the right side edge are shape measurement lines which are located immediately inward (75 mm inward) in the widthwise direction from the above described shape measurement lines located closest to the widthwise edges. As a result, the difference between the spacing between the representative shape measurement line L11 in the vicinity of the left side edge and the representative shape measurement line L15 in the vicinity of the right side edge and an actual width of sheet will be a value of −250 mm (=−100−75−75) to −100 μm. (=+50−75−75). In other words, the locations of the representative shape measurement line L11 in the vicinity of the left, side edge and the representative shape measurement line L15 in the vicinity of the right side edge will be inward from the actual edges of the hot-rolled steel sheet S by 50 mm to 125 mm in average. Therefore, it can be considered that the measurement of surface shape is performed at a location which is generally used for flatness control.

<A-11. Measurement Stability>

Table 1 shows an exemplary result of comparing the measurement stability between the cases where the linear pattern by the conventional projector including a slide is used and where the staggered pattern by the LED light source of the present embodiment is used, for the hot-rolled steel sheet S of the same kind of steel. Since the conditions of the surface of the hot-rolled steel sheet S varies according to the kind of steel, the measurement stability is compared on the same kind of steel as that for which the success rate of surface shape measurement is lower when the linear pattern by the conventional projector is used. The success rate of surface shape measurement and the determination rate of effectiveness in Table 1 show respectively average values of the values determined by the following Formulas (14) and (15) for each coil of the hot-rolled steel sheet S.

Success rate of surface shape measurement=(number of representative shape measurement lines for which surface shape is normally calculated/total number of representative shape measurement lines respectively determined in picked-up images for total length of a coil)×100 (14)

Determination rate of effectiveness=(number of times flatness measurement is successful/number of picked-up images for total length of a coil)×100 (15)

TABLE 1

| Projection pattern | Number of coils | Success rate of surface shape measurement | Determination rate of effectiveness |
|---|---|---|---|
| Linear pattern by conventional projector | 163 | 83.8% | 94.2% |
| Staggered pattern by LED light source | 60 | 99.80% | 99.99% |

As for the measurement of surface shape, while the success rate when the linear pattern by the conventional projector is used is 83.8%, the success rate has become 99.8% by using the staggered pattern by the LED light source of the present embodiment, thus achieving significant improvement. As the result, the determination rate of effectiveness also has improved from 94.2% to 99.9%.

As so far described, considering that, measurement defects when the linear pattern by the conventional projector is used have often occurred in portions of defective flatness where the control primarily needs to be performed, it is expected that the effect of applying the staggered pattern by the LED light source as with the present embodiment on the control of flatness measured values will become pronounced. Further, by turning on/off the control based on the determination of effectiveness of measurement result, it is possible to prevent control failures due to abnormal measured values, thereby realizing stable control.

B. Second Embodiment

<B-1. Configuration of LED Light Source>

Although, in the first embodiment described above, description has been made on a mode of LED light source in which a plurality of LEDs are disposed in a staggered manner, the present invention will not be limited to that, and it is also possible to use an LED light source in which a plurality of LEDs are disposed in a matrix form.

Figure 21B:
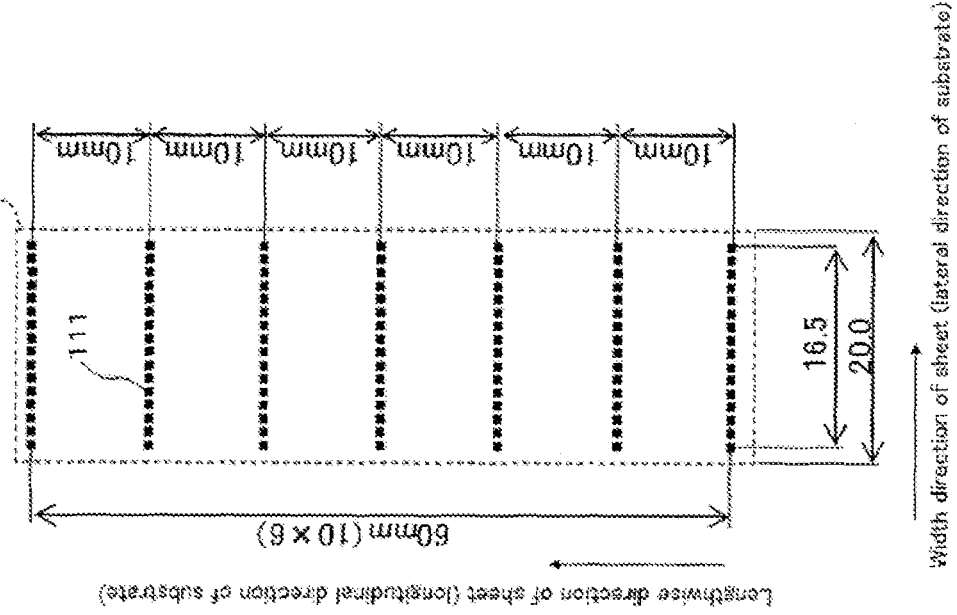
FIG. 21 (FIGS. 21A and 21B) is a schematic view showing an outline configuration of a variant of the LED light source shown in FIG. 8.
Figure 21A:
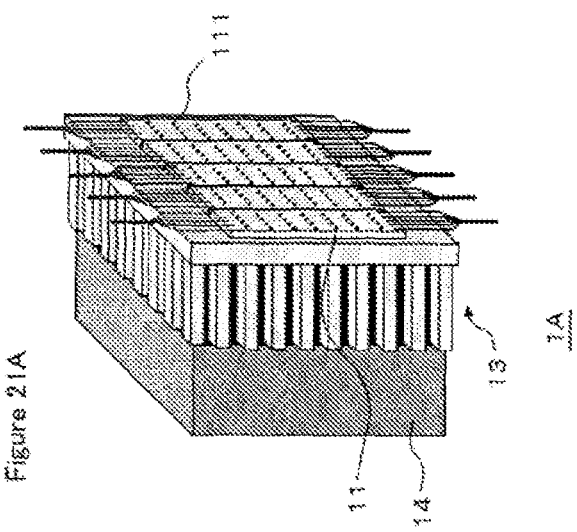

FIG. 21 is a schematic view showing an outline configuration of an LED light source 1A of the present embodiment. FIG. 21A is a perspective view of a principal part of the LED) light source 1A, and FIG. 21B is a diagram showing an arrangement example of LEDs 111 on each substrate 11. As shown in FIG. 21, the LED light source 1A of the present embodiment differs from the LED light source 1 of the first embodiment in that it has five substrates 11 in which a plurality of LEDs 111 are disposed in a matrix form. The LED 111 of the present embodiment, which has a size of 0.6 mm square and can output a maximum of 0.6 W at maximum, is secured on an insulated substrate 11 made of aluminum and electrically wired. Since a total of 112 LEDs 111, including 7 in the longitudinal direction (these seven LEDs 111 are connected in series) and 16 in the lateral direction, are disposed on each substrate 11, the input power to each substrate 11 is 67.2 W (=0.6×112). The LEDs 111 are disposed in a matrix form at a pitch of 10 mm in the longitudinal direction, and at a pitch of 1.1 mm in the lateral direction of the substrate 11. The other configurations of the LED light source 1A are similar to those of the LED light source 1 of the first embodiment, description thereof will be omitted. By using a flatness measurement apparatus having a similar configuration to that of the flatness measurement apparatus 100 of the first embodiment excepting that the LED light source 1A in place of the LED light source 1 is applied, it is also possible to accurately measure the flatness of the hot-rolled steel sheet S.

A bright and dark pattern, which is to be projected on to the surface of the hot-rolled steel sheet S by using the LED light source 1A of the present embodiment, has a very small arrangement pitch of the LED 111 in the lateral direction compared with the arrangement pitch in the longitudinal direction, and therefore will make one which has a substantially liner pattern.

Figure 22A:
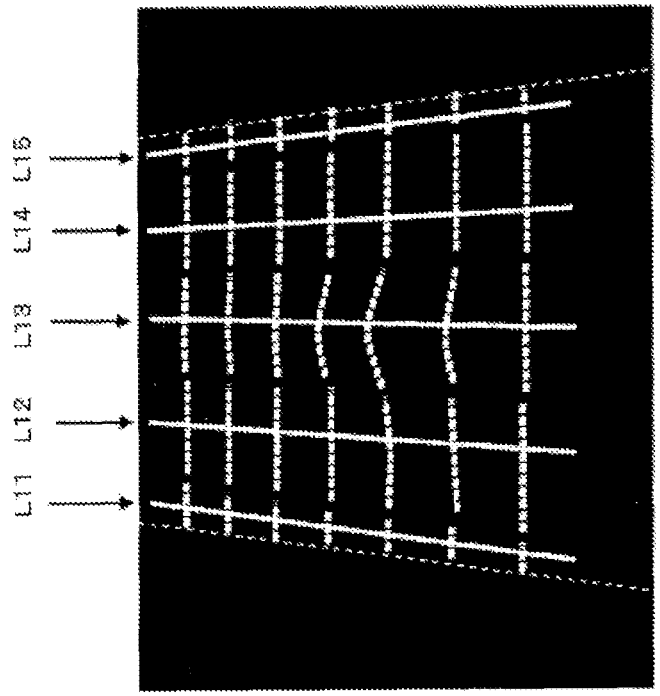
FIG. 22 (FIGS. 22A and 22B) shows an example of pattern image obtained by using the LED light source shown in FIG. 21.
Figure 22B:
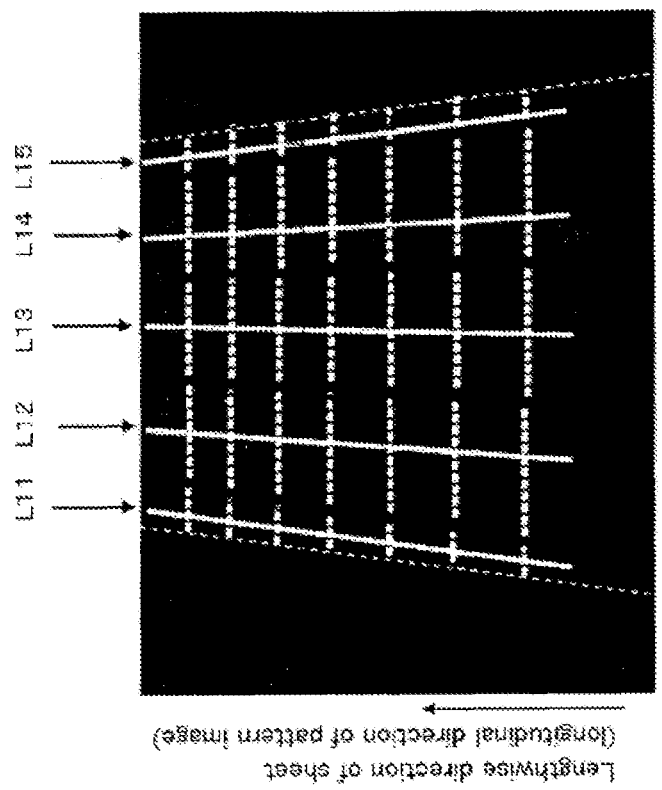

FIG. 22 shows an example of pattern image obtained by using the LED light source 1A of the present embodiment. FIG. 22A shows an example of pattern image obtained for a hot-rolled steel sheet S having a flat surface shape, and FIG. 22B shows an example of pattern image obtained for a hot-rolled steel sheet S in which center buckle has occurred.

As shown in FIG. 22, it is seen that the longitudinal pitch of the bright part of the bright and dark pattern in the central portion (on the representative shape measurement line L13) of a pattern image obtained for the hot-rolled steel sheet S in which center buckle has occurred has changed from the longitudinal pitch of the bright part of the bright and dark pattern in the central portion (on the representative shape measurement line L13) of the pattern image obtained for the hot-rolled steel sheet S having a flat surface shape. By subjecting this pattern image to the same processing as that in the first embodiment, it is possible to accurately measure the flatness of the hot-rolled steel sheet S as with the first embodiment.

It is noted that in the first and second embodiments described so far, description has been made by way of example to the case where the flatness (steepness) is measured at the exit side of a finish-rolling mill train of a manufacturing line for hot-rolled steel sheet. However, since the method relating to the present invention does not need a large-scaled measurement apparatus, and provides a good tracking ability to follow the meandering of hot-rolled steel sheet (see FIG. 20), it can be applied to the case in which the flatness is measured between finish rolling mills where the installation space is small, or immediately before a coil winding machine where the hot-rolled steel sheet exhibits a large meandering amount. Moreover, it is also applicable to the case where the flatness is measured at, for example, the exit side of a continuous annealing furnace of a manufacturing line for thin steel sheet, in which, in addition to hot-rolled steel sheet, defective flatness becomes an issue. Further, by using an image forming lens having a larger image-forming magnification, and placing the LED light source farther away from the surface of sheet material, it is also possible to measure a flatness of a larger sheet material such as a thick steel sheet.

The invention claimed is:

1. A method for measuring a flatness of a sheet material, comprising:
    forming a bright and dark pattern made up of bright parts and dark parts, the bright parts being disposed at first and second pitches respectively in first and, second directions by light emitted from an LED light source including a plurality of LEDs disposed at third and fourth pitches respectively in the first and second directions;
    projecting the bright and dark pattern onto a surface of the sheet material travelling in a lengthwise direction thereof such that the first direction of the bright and dark pattern lies along the lengthwise direction of the sheet material, and the second direction of the bright and dark pattern lies along a width direction of the sheet material;
    picking up an image of the bright and dark pattern with an image pickup device to acquire a pattern image; and
    analyzing the acquired pattern image by calculating a distribution of the first pitch of the bright parts along the first direction, calculating a surface shape of the sheet material along the first direction based on the calculated distribution of the first pitch, and measuring the flatness of the sheet material based on the calculated surface shape.

2. The method for measuring a flatness of a sheet material according to claim 1, wherein
    the image pickup device is disposed at a location where the image pickup device can receive light of the bright and dark pattern specularly reflected at the surface of the sheet material, and
    among current values to be applied to each LED included in the LED light source, the current value to be applied to an LED corresponding to a bright part resulting from specularly reflected light received by the image pickup device is set to be minimum.

3. The method for measuring a flatness of a sheet material according to claim 1, wherein
    a two-dimensional camera with an electronic shutter which can set an exposure timing and an exposure time is used as the image pickup device, and
    a lighting timing and a lighting time of the LED are respectively made synchronous with an exposure timing and an exposure time set in the two-dimensional camera with the electronic shutter.

4. The method for measuring a flatness of a sheet material according to claim 1, wherein
    as the LED, an LED that emits light of a single wavelength different from a peak wavelength of radiant light emanating from the sheet material is used, and
    a bandpass filter that passes only light having a wavelength of the emission wavelength of the LED and a wavelength close to the emission wavelength of the LED is disposed in front of the image pickup device.

5. A method for manufacturing a steel sheet, comprising rough-rolling a billet with a roughing-down mill, rolling the billet with a finish rolling mill train, and thereafter cooling the billet in a cooling zone to manufacture a steel sheet, wherein
    a rolling condition of the finish-rolling mill train or a cooling condition in the cooling zone is controlled based on a result of measuring a flatness of a steel sheet as the sheet material by the method for measuring a flatness according to claim 1.

6. The method for measuring a flatness of a sheet material according to claim 1, wherein the image pickup device is provided with a field of view larger than a width of the sheet material.

7. The method for measuring a flatness of a sheet material according to claim 1, wherein calculating the surface shape of the sheet material includes calculating a distribution of an inclination angle of the surface of the sheet material, based on a preliminarily determined relationship between the first pitch and the inclination angle of the surface of the sheet material.

8. A method for measuring a flatness of a sheet material, comprising:
    forming a staggered bright and dark pattern made up of bright parts and dark parts in which the bright parts are disposed at first and second pitches respectively in first and second directions by light emitted from an LED light source including a plurality of LEDs disposed in a staggered manner at third and fourth pitches respectively in the first and second directions, and projecting the staggered pattern onto a surface of the sheet material such that the first direction of the staggered pattern lies along a lengthwise direction of the sheet material, and the second direction of the staggered pattern lies along a width direction of the sheet material;

acquiring a pattern image by picking up an image of the staggered pattern with an image pickup device disposed at a location where the image pickup device can receive light in which the staggered pattern is specularly reflected at the surface of the sheet material;

setting a shape measurement line extending along the first direction of the staggered pattern at a predetermined location in the acquired pattern image;

averaging pixel densities on a straight line which passes pixels on the shape measurement line and extends in the second direction of the staggered pattern, and which has a length not less than twice the second pitch of the bright parts and calculating an average pixel density;

calculating a distribution of the average pixel density along the shape measurement line; and calculating a surface shape of the sheet material along the shape measurement line based on the calculated average pixel density distribution, and computing a flatness of the sheet material based on the calculated surface shape.

9. The method for measuring a flatness of a sheet material according to claim 8, wherein the image pickup device is provided with a field of view larger than a width of the sheet material.

10. A method for manufacturing a steel sheet, comprising rough-rolling a billet with a roughing-down mill, rolling the billet with a finish rolling mill train, and thereafter cooling the billet in a cooling zone to manufacture a steel sheet, wherein a rolling condition of the finish-rolling mill train or a cooling condition in the cooling zone is controlled based on a result of measuring a flatness of a steel sheet as the sheet material by the method for measuring a flatness according to claim 8.

11. A method for measuring a flatness of a sheet material, comprising:

forming a bright and dark pattern made up of bright parts and dark parts, the bright parts being disposed at first and second pitches respectively in first and second directions by light emitted from an LED light source including a plurality of LEDs disposed at third and fourth pitches respectively in the first and second directions;

projecting the bright and dark pattern onto a surface of the sheet material travelling in a lengthwise direction thereof such that the first direction of the bright and dark pattern lies along the lengthwise direction of the sheet material, and the second direction of the bright and dark pattern lies along a width direction of the sheet material;

picking up an image of the bright and dark pattern with an image pickup device to acquire a pattern image; and analyzing the acquired pattern image to measure the flatness of the sheet material, wherein a two-dimensional camera with an electronic shutter which can set an exposure timing and an exposure time is used as the image pickup device, and a lighting timing and a lighting time of the LED are respectively made synchronous with an exposure timing and an exposure time set in the two-dimensional camera with the electronic shutter.

12. A method for measuring a flatness of a sheet material, comprising:

forming a bright and dark pattern made up of bright parts and dark parts, the bright parts being disposed at first and second pitches respectively in first and second directions by light emitted from an LED light source including a plurality of LEDs disposed at third and fourth pitches respectively in the first and second directions;

projecting the bright and dark pattern onto a surface of the sheet material travelling in a lengthwise direction thereof such that the first direction of the bright and dark pattern lies along the lengthwise direction of the sheet material, and the second direction of the bright and dark pattern lies along a width direction of the sheet material;

picking up an image of the bright and dark pattern with an image pickup device to acquire a pattern image; and analyzing the acquired pattern image to measure the flatness of the sheet material, wherein as the LED, an LED that emits light of a single wavelength different from a peak wavelength of radiant light emanating from the sheet material is used, and a bandpass filter that passes only light having a wavelength of the emission wavelength of the LED and a wavelength close to the emission wavelength of the LED is disposed in front of the image pickup device.

* * * * *